(12) United States Patent
Sakamoto

(10) Patent No.: US 11,597,494 B2
(45) Date of Patent: Mar. 7, 2023

(54) AIRFOIL AND MECHANICAL MACHINE HAVING THE SAME

(71) Applicant: MITSUBISHI HEAVY INDUSTRIES, LTD., Tokyo (JP)

(72) Inventor: Yasuro Sakamoto, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 623 days.

(21) Appl. No.: 16/685,158

(22) Filed: Nov. 15, 2019

(65) Prior Publication Data
US 2020/0269966 A1 Aug. 27, 2020

(30) Foreign Application Priority Data
Feb. 26, 2019 (JP) .............................. JP2019-032568

(51) Int. Cl.
| | | |
|---|---|---|
| *F01D 5/14* | (2006.01) | |
| *B64C 3/14* | (2006.01) | |
| *B64C 5/02* | (2006.01) | |

(52) U.S. Cl.
CPC ............... *B64C 3/14* (2013.01); *F01D 5/145* (2013.01); *F01D 5/148* (2013.01); *B64C 5/02* (2013.01);
(Continued)

(58) Field of Classification Search
CPC ....... B64C 3/14; B64C 5/02; B64C 2003/146; B64C 2003/147; F01D 5/145; F01D 5/148
See application file for complete search history.

(56) References Cited

U.S. PATENT DOCUMENTS

| | | | | |
|---|---|---|---|---|
| 2,166,823 A | * | 7/1939 | Rosenlocher | ........... F01D 5/145 415/115 |
| 2,266,529 A | * | 12/1941 | Wright | .................. B64C 23/005 244/87 |

(Continued)

FOREIGN PATENT DOCUMENTS

| | | |
|---|---|---|
| CN | 107021207 | 8/2017 |
| JP | 4-314692 | 11/1992 |

(Continued)

OTHER PUBLICATIONS

Office Action dated Mar. 2, 2022 in corresponding Chinese Patent Application No. 201911100487.X, with Machine Translation.
(Continued)

*Primary Examiner* — Igor Kershteyn
*Assistant Examiner* — Theodore C Ribadeneyra
(74) *Attorney, Agent, or Firm* — Wenderoth, Lind & Ponack, L.L.P.

(57) ABSTRACT

An airfoil including: an airfoil portion having an airfoil surface; and a communication hole extending at least in the airfoil portion and a first opening open in the airfoil surface, through which the first opening is communicated with a second opening provided in a portion of the airfoil. On a cross-section perpendicular to the spanwise direction through a position of the first opening of the spanwise direction, an angle A1 satisfying a condition (a) exists within an angle range −10 degrees to 10 degrees with respect to an extension line obtained by extending a camber line of the airfoil portion from a leading edge. The condition (a) is a static pressure at a position of the first opening is equal to a static pressure at a position of the second opening when the airfoil portion receives a fluid flow from a direction of the angle A1 toward the leading edge.

15 Claims, 16 Drawing Sheets

(52) U.S. Cl.
CPC .. *B64C 2003/146* (2013.01); *B64C 2003/147* (2013.01)

(56) References Cited

U.S. PATENT DOCUMENTS

| | | | | |
|---|---|---|---|---|
| 5,375,972 | A * | 12/1994 | Gray | F01D 5/148 415/115 |
| 5,472,314 | A * | 12/1995 | Delonge | F01D 5/148 415/115 |
| 5,779,437 | A * | 7/1998 | Abdel-Messeh | F01D 5/186 415/115 |
| 5,931,638 | A * | 8/1999 | Krause | F01D 5/186 415/115 |
| 6,139,259 | A * | 10/2000 | Ho | F04D 29/684 415/208.1 |
| 7,246,992 | B2 * | 7/2007 | Lee | F01D 5/186 415/115 |
| 7,568,887 | B1 * | 8/2009 | Liang | F01D 5/187 416/97 R |
| 7,866,948 | B1 * | 1/2011 | Liang | F01D 5/187 416/97 R |
| 8,016,567 | B2 * | 9/2011 | Praisner | F04D 29/684 416/231 A |
| 8,047,790 | B1 * | 11/2011 | Liang | F01D 5/187 416/97 R |
| 8,651,813 | B2 * | 2/2014 | Long | F15D 1/10 416/90 A |
| 8,794,906 | B1 * | 8/2014 | Liang | F01D 5/145 415/115 |
| 9,062,555 | B2 * | 6/2015 | Schnieder | F01D 5/186 |
| 10,046,389 | B2 * | 8/2018 | Simpson | C25D 5/14 |
| 10,107,104 | B2 * | 10/2018 | Bloxham | F01D 9/041 |
| 10,173,768 | B2 * | 1/2019 | Goelling | B64C 9/18 |
| 10,280,757 | B2 * | 5/2019 | Kupratis | F01D 5/145 |
| 10,337,493 | B2 * | 7/2019 | Chen | F03D 3/062 |
| 10,472,052 | B2 | 11/2019 | Heller | |
| 10,519,976 | B2 * | 12/2019 | Shimo | F04D 29/325 |
| 10,928,839 | B2 * | 2/2021 | Glezer | B64C 21/025 |
| 11,111,025 | B2 * | 9/2021 | Zha | B64C 21/025 |
| 2001/0036401 | A1 * | 11/2001 | Harvey | F04D 29/681 415/115 |
| 2003/0150962 | A1 * | 8/2003 | Orban | F04D 29/681 244/209 |
| 2005/0025623 | A1 * | 2/2005 | Botrel | F01D 5/187 416/97 R |
| 2009/0162189 | A1 * | 6/2009 | Wagner | F02C 9/18 415/115 |
| 2009/0212165 | A1 * | 8/2009 | Parikh | B64C 21/06 244/209 |
| 2010/0266385 | A1 * | 10/2010 | Praisner | F04D 29/684 415/115 |
| 2010/0329848 | A1 * | 12/2010 | Harvey | F04D 29/682 415/115 |
| 2011/0052373 | A1 * | 3/2011 | Sparks | F01D 5/145 415/115 |
| 2011/0135447 | A1 * | 6/2011 | Guo | F01D 25/32 415/169.3 |
| 2011/0236221 | A1 * | 9/2011 | Campbell | F01D 5/187 416/97 R |
| 2012/0009065 | A1 * | 1/2012 | Harvey | F04D 29/682 416/91 |
| 2016/0052621 | A1 * | 2/2016 | Ireland | F04D 29/681 137/13 |
| 2016/0146015 | A1 * | 5/2016 | Hussain | F01D 5/148 416/147 |
| 2016/0160653 | A1 * | 6/2016 | Choi | F01D 5/18 416/223 A |
| 2017/0284422 | A1 * | 10/2017 | Stieger | F04D 29/281 |
| 2020/0269968 | A1 * | 8/2020 | Sakamoto | B64C 5/06 |
| 2020/0362704 | A1 * | 11/2020 | Burnes | F01D 5/148 |
| 2021/0054747 | A1 * | 2/2021 | Spangler | F01D 5/141 |

FOREIGN PATENT DOCUMENTS

| | | |
|---|---|---|
| JP | 2005-98203 | 4/2005 |
| JP | 2014-181621 | 9/2014 |

OTHER PUBLICATIONS

Office Action dated Nov. 1, 2022 in corresponding Japanese Patent Application No. 2019-032568, with Machine Translation.

* cited by examiner

AIRFOIL AND MECHANICAL MACHINE HAVING THE SAME

TECHNICAL FIELD

This disclosure relates to a airfoil and a mechanical machine having the same.

BACKGROUND

In airfoils applied to mechanical machines such as a rotary machine or a fluid machine, a loss is generated due to flow separation on an airfoil surface or the like, and this reduces performance or operation efficiency of the mechanical machine in some cases. In this regard, an airfoil profile is designed to reduce the loss caused by the fluid separation or the like in some cases.

Patent Document 1 discusses a turbine blade (airfoil) having a bypass passage provided around a support wall surface to penetrate from a ventral side (positive pressure side) to a back side (suction pressure side) in the vicinity of a maximum thickness portion of the airfoil portion. In this turbine blade, a pressure difference between the ventral side and the back side around the support wall surface is reduced by bypassing a part of the working fluid from the ventral side to the back side via the bypass passage described above around the support wall surface, so that the flow loss is reduced by reducing a secondary flow.

CITATION LIST

Patent Literature

Patent Document 1: JP2005-98203A

SUMMARY

Meanwhile, in recent years, requirements for the operation condition of the mechanical machine such as a rotary machine are diversified, and the operation is performed under an operation condition (such as a partial load operation) deviated from a design point in some cases. Therefore, an airfoil capable of preventing fluid separation even under a machine operation condition deviated from the design point is demanded.

At least an embodiment of the present invention has been made in view of the above-described problems, and an object thereof is to provide a airfoil and a mechanical machine having the same, capable of suppressing flow separation that may occur on an airfoil surface.

(1) According to at least an embodiment of the present invention, there is provided a airfoil, including: an airfoil portion having an airfoil surface extending along a spanwise direction between a leading edge and a trailing edge; and at least one communication hole extending at least in the airfoil portion and having a first opening end opened to the airfoil surface, through which the first opening end is communicated with a second opening end provided in a portion of the airfoil other than the airfoil portion or a device on which the airfoil is installed, wherein, on a cross-section perpendicular to the spanwise direction through a position of the first opening end of the spanwise direction, an angle A1 satisfying a condition (a) exists within an angle range equal to or larger than −10 degrees and equal to or smaller than 10 degrees with respect to an extension line obtained by extending a camber line of the airfoil portion from the leading edge while setting the leading edge as a center, and wherein the condition (a) is a condition that a static pressure at a position of the first opening end is equal to a static pressure at a position of the second opening end when the airfoil portion receives a fluid flow from a direction of the angle A1 toward the leading edge.

In some cases, the device having the airfoil is designed such that the direction of the fluid (main flow) flowing to the airfoil follows an extension line obtained by extending the camber line of the airfoil portion from the leading edge. In such a airfoil, the angle A1 described above indicates a direction following the extension line of the camber line of the airfoil portion. That is, the angle A1 indicates the incidence angle (corresponding to the angle of attack) of the fluid onto the airfoil portion in the operation of the device having the airfoil at the design point.

In this regard, in the configuration of the paragraph (1) described above, in the operation at the design point (that is, under the operation condition in which the fluid flows to the airfoil portion from the direction of the angle A1), the first and second opening ends of the communication hole are provided in the positions where the static pressures become equal to each other. Therefore, under the operation condition in the vicinity of the design point, there is substantially no pressure difference between the positions of the first and second opening ends, and a flow passing through the communication hole is not basically generated. Meanwhile, when the operation condition is deviated from the design point (that is, when the incidence angle of the fluid is deviated from the angle A1), a pressure difference is generated between the positions of the first and second opening ends. As a result, a flow passing through the communication hole is generated from one of the opening ends of the high-pressure side to the other opening end of the low-pressure side. In addition, as this flow is output from the opening end of the low-pressure side, momentum is supplied to the flow (main flow) around the surface of the member provided with the opening end of the low-pressure side (typically, airfoil portion), so that it is possible to suppress flow separation that may occur on this surface.

Therefore, in the configuration of the paragraph (1) described above, it is possible to suppress performance degradation in the operation in the vicinity of the design point, and suppress flow separation on the airfoil surface that may occur when the operation condition is deviated from the design point.

Note that which one of the first and second opening ends has the position having a higher or lower pressure when the operation condition of the device having the airfoil is deviated from the design point depends on the shape of the airfoil portion, the positions of the first and second opening ends, how much the operation condition is deviated from the design point (that is, what is the deviated direction of the incidence angle of the fluid), or the like.

(2) According to some embodiments, in the configuration of the paragraph (1) described above, the device includes a fuselage of an aircraft, and the airfoil portion includes a vertical tail or a horizontal tail of the aircraft.

In the configuration of the paragraph (2) described above, the first opening end opened to the airfoil surface of the vertical tail or the horizontal tail of the aircraft is provided. In addition, the second opening end is provided in the position on the surface of the fuselage having the same static pressure as that of the position of the first opening end in the operation at the design point of the aircraft (for example, operation at a cruising speed). Therefore, as described in the paragraph (1) above, it is possible to suppress performance degradation in the operation in the vicinity of the design point, and suppress flow separation on the surface (airfoil surface) of the vertical tail or the horizontal tail that may occur when the operation condition is deviated from the design point.

(3) According to some embodiments, in the configuration of the paragraph (2) described above, the airfoil surface includes a left side surface and a right side surface of the vertical tail. In addition, the first opening end is opened to the left side surface of the vertical tail while the second opening end is opened to a surface of a right-side portion of the fuselage. Alternatively, the first opening end is opened to the right side surface of the vertical tail while the second opening end is opened to a surface of a left-side portion of the fuselage.

In the configuration of the paragraph (3) described above, when the first opening end is provided on the left side surface of the vertical tail, and the second opening end is provided on the right-side portion of the fuselage, under a flight condition (operation condition) in which the air flow is directed from the right side to the fuselage (that is, a flight condition deviated from the design point), a flow passing through the communication hole from the second opening end of the right side to the left surface of the vertical tail is generated. In addition, when the first opening end is provided on the right side surface of the vertical tail, and the second opening end is provided on the left-side portion of the fuselage, under a flight condition in which the air flow is directed from the left side to the fuselage (that is, when the flight condition is deviated from the design point), a flow passing through the communication hole from the second opening end of the left side to the right side surface of the vertical tail is generated.

Therefore, in the configuration of the paragraph (3) described above, it is possible to suppress flow separation on the left side surface or the right side surface of the vertical tail that may occur when the flight condition is deviated from the design point.

(4) According to some embodiments, in the configuration of the paragraph (2) described above, the airfoil surface includes an upper surface and a lower surface of the horizontal tail, the first opening end is opened to the upper surface or the lower surface of the horizontal tail, and the second opening end is opened to a surface of the fuselage.

In the configuration of the paragraph (4) described above, for example, when the first opening end is provided on the lower surface of the horizontal tail, and the second opening end is provided on the upper surface of the fuselage, under the flight condition in which the air flow is directed from the upper side to the fuselage (that is, under the flight condition deviated from the design point), a flow passing through the communication hole from the second opening end of the upper surface of the fuselage to the lower surface of the horizontal tail is generated. In addition, for example, when the first opening end is provided on the upper surface of the horizontal tail, and the second opening end is provided on the lower surface of the fuselage, under the flight condition in which the air flow is directed from the lower side to the fuselage (that is, under the flight condition deviated from the design point), a flow passing through the communication hole from the second opening end of the lower surface of the fuselage to the upper surface of the horizontal tail is generated.

Therefore, in the configuration of the paragraph (4) described above, it is possible to suppress flow separation on the upper or lower surface of the horizontal tail that may occur when the flight condition is deviated from the design point.

(5) According to at least an embodiment of the present invention, there is provided a airfoil including: an airfoil portion having an airfoil surface extending along a spanwise direction between a leading edge and a trailing edge; a connection member to which the airfoil portion is connected; and at least one communication hole having a first opening end opened to the airfoil surface and a second opening end opened to a surface of the connection member and extending in the airfoil portion and the connection member.

In the operation at the design point of the device having the airfoil, a position having the same static pressure as that of the position on the surface of the airfoil portion (airfoil surface) exists on the surface of the connection member in some cases.

In this regard, in the configuration of the paragraph (5) described above, the first opening end of the communication hole is provided on the airfoil surface, and the second opening end is provided on the surface of the connection member. Therefore, it is possible to provide the first and second opening ends in the positions where the static pressures become equal to each other in the operation at the design point of the device having the airfoil. Therefore, by providing the first and second opening ends in such positions, a pressure difference is not substantially generated in the positions of the first and second opening ends under the operation condition in the vicinity of the design point, and a flow passing through the communication hole is not basically generated. Meanwhile, when the operation condition is deviated from the design point, a pressure difference is generated between the positions of the first and second opening ends. As a result, a flow passing through the communication hole from one of the opening ends of the high-pressure side to the other opening end of the low-pressure side is generated. In addition, as this flow is output from the opening end of the low-pressure side, momentum is supplied to the flow (main flow) around the surface of the member provided with the opening end of the low-pressure side (typically, airfoil portion), so that it is possible to suppress flow separation that may occur on such a surface.

Therefore, in the configuration of the paragraph (5) described above, it is possible to suppress performance degradation in the operation in the vicinity of the design point and suppress flow separation on the airfoil surface that may occur when the operation condition is deviated from the design point.

(6) According to some embodiments, in the configuration of the paragraph (5) described above, the airfoil surface includes a pressure surface and a suction surface, and the surface of the connection member is connected to the airfoil portion and includes an end wall surface forming a flow path of a working fluid of a turbine.

In the airfoil having the configuration of the paragraph (6) described above, the airfoil portion including the pressure surface and the suction surface is connected to the end wall surface that forms the flow path of the working fluid of the turbine, and the working fluid of the turbine flows around the pressure surface and the suction surface of the airfoil portion. In addition, when the operation condition of the turbine is deviated from the design point (rated operation), flow separation of the working fluid may occur on the pressure surface or the suction surface. In this regard, in the configuration of the paragraph (6) described above, the first opening end is provided on the pressure surface or the suction surface of the airfoil portion, and the second opening end is provided on the surface of the connection member. Therefore, as described in the paragraph (5) above, it is possible to suppress performance degradation in the operation in the vicinity of the design point and suppress flow separation on the pressure surface or the suction surface that may occur when the operation condition is deviated from the design point.

(7) According to some embodiments, in the configuration of the paragraph (6) described above, the first opening end is opened to the pressure surface or the suction surface, and the second opening end is opened to the end wall surface of the connection member.

In some cases, a position having the same static pressure as that of the position of the pressure surface or the suction surface exists on the end wall surface of the connection member, to which the airfoil portion is connected, in the rated operation of the turbine (operation at the design point). In this regard, in the configuration of the paragraph (7) described above, the first opening end is opened to the pressure surface or the suction surface of the airfoil portion, and the second opening end is opened to the end wall surface of the connection member. Therefore, as described in the paragraph (6) above, it is possible to suppress performance degradation in the operation in the vicinity of the design point of the turbine and suppress flow separation on the pressure surface or the suction surface that may occur when the operation condition is deviated from the design point.

(8) According to some embodiments, in the configuration of the paragraph (6) described above, the surface of the connection member further includes an upstream end surface disposed in an upstream from the airfoil portion and extending along a plane perpendicular to an axial direction, the first opening end is opened to the pressure surface or the suction surface, and the second opening end is opened to the upstream end surface.

In some cases, a position having the same static pressure as that of the position of the pressure surface or the suction surface in the rated operation of the turbine (operation at the design point) exists on the upstream end surface of the connection member to which the airfoil portion is connected. In this regard, in the configuration of the paragraph (8) described above, the first opening end is opened to the pressure surface or the suction surface of the airfoil portion, and the second opening end is opened to the upstream end surface of the connection member. Therefore, as described in the paragraph (6) above, it is possible to suppress performance degradation in the operation in the vicinity of the design point of the turbine and suppress flow separation on the pressure surface or the suction surface that may occur when the operation condition is deviated from the design point.

(9) According to some embodiments, in the configuration of the paragraph (6) described above, the surface of the connection member further has a downstream end surface disposed downstream from the airfoil portion and extends along a plane perpendicular to an axial direction, the first opening end is opened to the pressure surface or the suction surface, and the second opening end is opened to the downstream end surface.

In some cases, a position having the same static pressure as that of the position of the pressure surface or the suction surface in the rated operation of the turbine (operation at the design point) exists on the downstream end surface of the connection member to which the airfoil portion is connected. In this regard, in the configuration of the paragraph (9) described above, the first opening end is opened to the pressure surface or the suction surface of the airfoil portion, and the second opening end is opened to the downstream end surface of the connection member. Therefore, as described in the paragraph (6) above, it is possible to suppress performance degradation in the operation in the vicinity of the design point of the turbine and suppress flow separation on the pressure surface or the suction surface that may occur when the operation condition is deviated from the design point.

(10) According to some embodiments, in the configuration of the paragraph (6) described above, the surface of the connection member includes a circumferential end surface, the circumferential end surface of the connection member of the airfoil and a circumferential end surface of a connection member of an airfoil adjacent to the airfoil in a circumferential direction face each other by interposing a gap, the first opening end is opened to the pressure surface or the suction surface, and the second opening end is opened to the circumferential end surface.

In some cases, a position having the same static pressure as that of the position of the pressure surface or the suction surface in the rated operation of the turbine (operation at the design point) exists on the circumferential end surface of the connection member to which the airfoil portion is connected. In this regard, in the configuration of the paragraph (10) described above, the first opening end is opened to the pressure surface or the suction surface of the airfoil portion, and the second opening end is opened to the circumferential end surface of the connection member. Therefore, as described in the paragraph (6) above, it is possible to suppress performance degradation in the operation in the vicinity of the design point of the turbine and suppress flow separation on the pressure surface or the suction surface that may occur when the operation condition is deviated from the design point.

(11) According to some embodiments, in the configuration of any one of the paragraphs (6) to (10) described above, the first opening end is opened to the pressure surface at a position on the leading edge side from a point on the pressure surface having a tangential line parallel to a chord direction of the airfoil portion.

In the airfoil applied to the turbine, when an incidence angle (angle of attack) of the working fluid against the airfoil is negative (when the fluid flow is directed to collide with the suction surface relative to the design point), flow separation easily occurs on the pressure surface in the vicinity of a point on the pressure surface having a tangential line parallel to the chord direction in some cases. In this regard, in the configuration of the paragraph (11) described above, the first opening end is provided on the pressure surface at a position on the leading edge side from such a position on the pressure surface where flow separation easily occurs. Therefore, it is possible to effectively suppress fluid separation that may easily occur on the pressure surface in the case of a negative incidence angle as described above.

(12) According to some embodiments, in the configuration of any one of the paragraphs (6) to (10) described above, the first opening end is opened to the suction surface at a position on the leading edge side from an intersecting point between the suction surface and a straight line through the leading edge and parallel to the camber line of the airfoil portion in the leading edge (the line having the same distance from the pressure surface and the suction surface of the airfoil).

In the airfoil applied to the turbine, when the incidence angle (angle of attack) of the fluid against the airfoil is positive (that is, when the flow of the fluid is directed to collide with the pressure surface relative to the design point), flow separation on the suction surface easily occurs at the position on the trailing edge side from the intersecting point between the suction surface and the straight line through the leading edge and parallel to the camber line of the airfoil portion in the leading edge in some cases. In this regard, in the configuration of the paragraph (12) described above, the first opening end is provided on the suction surface in the leading edge side from the position where flow separation easily occurs on the suction surface in this manner. Therefore, it is possible to effectively suppress fluid separation that may easily occur on the suction surface in the case of a positive incidence angle as described above.

(13) According to some embodiments, in the configuration of any one of the paragraphs (5) to (11) described above, on a cross-section perpendicular to the spanwise direction through a position of the first opening end of the spanwise direction, an angle A1 satisfying a condition (a) exists within an angle range equal to or larger than −10 degrees and equal to or smaller than 10 degrees with respect to an extension line obtained by extending a camber line of the airfoil portion from the leading edge while setting the leading edge as a center, and the condition (a) is a condition that a static pressure at a position of the first opening end of the airfoil surface is equal to a static pressure at a position of the second opening end on the surface of the connection member when the airfoil portion receives a fluid flow from a direction of the angle A1 toward the leading edge.

In the configuration of the paragraph (13) described above, the first and second opening ends of the communication hole are provided in the positions where the static pressures become equal to each other in the operation at the design point of the turbine (that is, under the operation condition in which the fluid flows to the airfoil portion from the direction of the angle A1). Therefore, under the operation condition in the vicinity of the design point, there is substantially no pressure difference between the first and second opening ends, and a flow passing through the communication hole is not basically generated. Meanwhile, when the operation condition is deviated from the design point (that is, when the incidence angle of the fluid is deviated from the angle A1), a pressure difference is generated between the position of the first opening end and the position of the second opening end. As a result, a flow passing through the communication hole from one of the opening ends of the high-pressure side to the other opening end of the low-pressure side is generated. In addition, as this flow is output from the opening end of the low-pressure side, momentum is supplied to the flow around the surface of the airfoil surface provided with the opening end of the low-pressure side (pressure surface or suction surface), so that it is possible to suppress flow separation that may occur on this surface.

Therefore, in the configuration of the paragraph (13) described above, it is possible to suppress performance degradation in the operation in the vicinity of the design point and suppress flow separation on the airfoil surface that may occur when the operation condition is deviated from the design point.

(14) According to some embodiments, in the configuration of any one of the paragraphs (1) to (13) described above, viewed from the spanwise direction, an angle between a part of a tangential line of the airfoil surface at the first opening end, the part being located in the leading edge side from the first opening end, and the communication hole of the first opening end is equal to or smaller than 45 degrees.

In the configuration of the paragraph (14) described above, since the communication hole has a shape matching the airfoil surface at the position of the first opening end, it is possible to reduce a mixing loss with the fluid flowing around the airfoil surface when the flow from the communication hole is output from the first opening end.

(15) According to at least one embodiment of the present invention, there is provided a mechanical machine having the airfoil according to any one of the paragraphs (1) to (14) described above.

In the configuration of the paragraph (15) described above, if the airfoil has the characteristic of the paragraph (1) described above, the first and second opening ends of the communication hole are provided in the positions where the static pressures become equal to each other in the operation at the design point (that is, under the operation condition in which the fluid flows to the airfoil portion from the direction of the angle A1). Alternatively, in the configuration of the paragraph (15) described above, if the airfoil has the characteristic of the paragraph (5) described above, the first opening end of the communication hole is provided on the airfoil surface, and the second opening end is provided on the surface of the connection member. Therefore, it is possible to provide the first and second opening ends in the positions where the static pressures become equal to each other in the operation at the design point of the device having the airfoil.

Therefore, under the operation condition in the vicinity of the design point, there is substantially no pressure difference between the positions of the first and second opening ends, and the flow passing through the communication hole is not basically generated. Meanwhile, when the operation condition is deviated from the design point, a pressure difference is generated between the positions of the first and second opening ends. As a result, a flow passing through the communication hole from one of the opening ends of the high-pressure side to the other opening end of the low-pressure side is generated. In addition, as this flow is output from the opening end of the low-pressure side, momentum is supplied to the flow (main flow) around the surface of the member provided with the opening end of the low-pressure side (typically, airfoil portion), so that it is possible to suppress flow separation that may occur on this surface.

According to at least one embodiment of the present invention, it is possible to provide an airfoil and a mechanical machine having the same, capable of suppressing flow separation that may occur on an airfoil surface.

DETAILED DESCRIPTION

Figure 1:
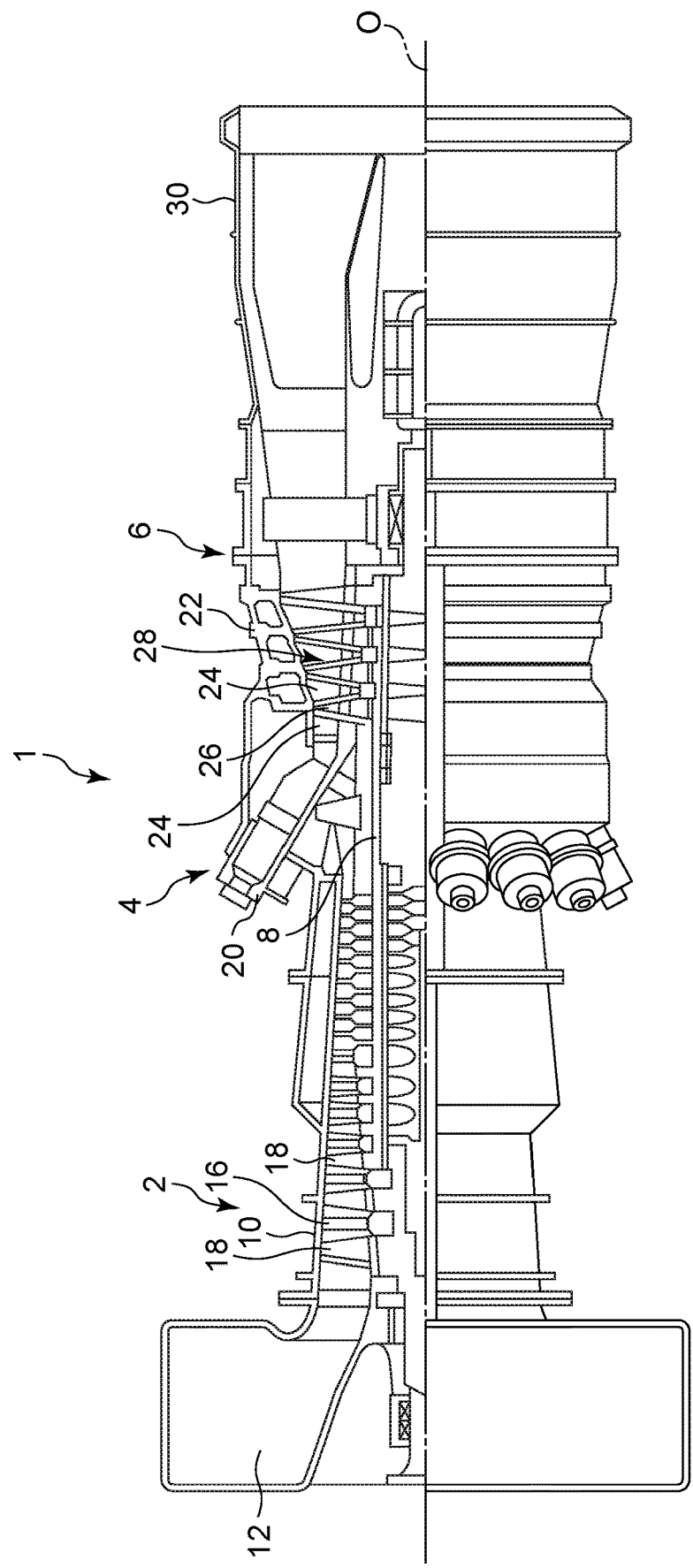
FIG. 1 is a schematic configuration diagram illustrating a gas turbine according to an embodiment.

Hereinafter, some embodiments of the present invention will be described with reference to the accompanying drawings. However, dimensions, materials, shapes, relative placement, or the like of components described in the embodiments or illustrated in the drawings are not intended to limit the scope of the invention, and are merely illustrative examples.

The airfoil according to some embodiments is applied to a mechanical machine such as an aircraft or a fluid machine (such as a gas turbine). Although it will be described in details below, the airfoil according to some embodiments has an airfoil portion having an airfoil surface and a communication hole extending at least in the airfoil portion. A first opening end of the communication hole is opened to the airfoil surface of the airfoil portion, and a second opening end of the communication hole is formed in a part of the airfoil other than the airfoil portion (such as a platform or shroud of a turbine blade) or a device in which the airfoil is installed (such as a fuselage of an aircraft).

Hereinafter, an airfoil applied to a gas turbine or an aircraft will be described as the airfoil according to some embodiments.

FIG. 1 is a schematic configuration diagram illustrating a gas turbine according an embodiment. As illustrated in FIG. 1, the gas turbine 1 includes a compressor 2 for generating compressed air, a combustor 4 for generating combustion gas using the compressed air and fuel, and a turbine 6 rotated by the combustion gas. In the case of an electricity generation gas turbine 1, a generator (not shown) is connected to the turbine 6.

The compressor 2 includes a plurality of stator vanes 16 fixed to a compressor casing 10 side and a plurality of rotor blades 18 inserted into a rotor 8 and arranged alternately with the stator vanes 16.

The air received from an air intake 12 is sent to the compressor 2, where the air is compressed via a plurality of stator vanes 16 and a plurality of rotor blades 18 to generate compressed air having a high temperature and a high pressure.

The combustor 4 is supplied with the fuel and the compressed air generated from the compressor 2, so that the fuel is combusted in the combustor 4 to generate the combustion gas as a working fluid of the turbine 6. As illustrated in FIG. 1, the gas turbine 1 has a plurality of combustors 4 arranged along a circumferential direction with respect to the rotor 8 in a casing 20.

The turbine 6 has a combustion gas passage 28 formed by the turbine casing 22, including a plurality of stator vanes 24 and a plurality of rotor blades 26 provided in the combustion gas passage 28. The stator vanes 24 and the rotor blades 26 of the turbine 6 are provided downstream in the combustor 4 in the combustion gas flow.

The stator vanes 24 are fixed to the turbine casing 22 side, and a plurality of stator vanes 24 arranged along the circumferential direction of the rotor 8 constitute a stator vane row. In addition, the rotor blades 26 are inserted into the rotor 8, and a plurality of rotor blades 26 arranged along the circumferential direction of the rotor 8 constitute a rotor blade row. The stator vane rows and the rotor blade rows are alternately arranged along an axial direction of the rotor 8.

In the turbine 6, the combustion gas flowing from the combustor 4 to the combustion gas passage 28 passes through a plurality of stator vanes 24 and a plurality of rotor blades 26, so as to rotate the rotor 8. As a result, the generator connected to the rotor 8 is driven to generate power. The combustion gas used to drive the turbine 6 is discharged to the outside via an exhaust chamber 30.

At least one of the rotor blades 26 or the stator vanes 24 described above may include the airfoil according to an embodiment of the invention. FIGS. 2 to 5 are schematic perspective views illustrating respective blades (airfoils) 32 according to an embodiment. The blades 32 illustrated in FIGS. 2 to 5 are applicable as the rotor blades 26 described above.

As illustrated in FIGS. 2 to 5, the blade 32 according to an embodiment (blades 32A to 32D: rotor blades 26) has an airfoil portion 40 extending between a base end 43 and a tip 44, a platform 38 (connection member) to which the airfoil portion 40 is connected, and a communication hole 50 extending in the airfoil portion 40 and the platform 38.

The airfoil portion 40 has a pressure surface 45 (airfoil surface) and a suction surface 46 (airfoil surface) extending along a spanwise direction between a leading edge 41 and a trailing edge 42. Viewed from the spanwise direction, the pressure surface 45 has a recessed shape recessed inward of the airfoil portion 40, and the suction surface 46 has a protruding shape protruding outward of the airfoil portion 40 from the inside. Note that, herein, the spanwise direction refers to a direction obtained by linking the base end 43 and the tip 44 of the airfoil portion 40, and substantially matches a radial direction of the rotor 8 when the blade 32 is installed in the turbine 6 (when the rotor blade 26 is installed in the rotor 8).

The platform 38 is provided between a blade root portion (not shown) buried in the rotor 8 and the airfoil portion 40 in the spanwise direction. The platform 38 has an end wall surface 62 to which the airfoil portion 40 is connected, an upstream end surface 64 positioned in the upstream from the airfoil portion 40, a downstream end surface 66 positioned downstream from the airfoil portion 40, and a pair of circumferential end surfaces 68 and 69.

Herein, the "upstream" refers to an upstream side in the fluid flow around the blade, and the "downstream" refers to a downstream side in the fluid flow around the blade. Note that, in the case of the turbine 6 of the gas turbine 1 of FIG. 1, a fluid flow direction around the blade typically follows the axial direction of the rotor 8.

The end wall surface 62 forms a flow path of the working fluid (combustion gas passage 28: see FIG. 1) in the turbine 6 along with the turbine casing 22.

The upstream end surface 64 and the downstream end surface 66 extend along a plane perpendicular to the axial direction of the rotor 8. Here, the axial direction of the rotor 8 typically matches the chord direction of the airfoil portion 40 (the direction obtained by linking the leading edge 41 and the trailing edge 42 of the airfoil portion 40).

Figure 6:
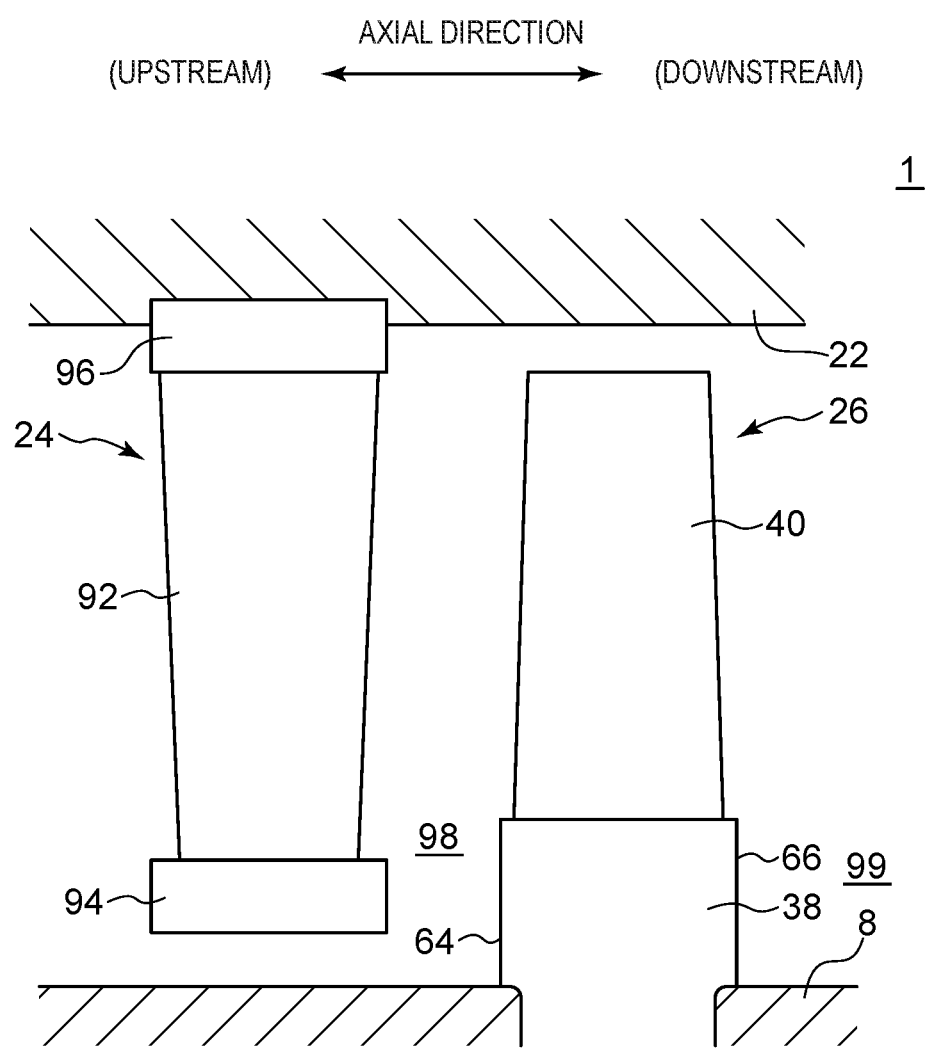
FIG. 6 is a partial schematic view illustrating a turbine having blades (rotor blades; airfoil) according to an embodiment.

Here, FIG. 6 is a partial schematic view illustrating the turbine 6 having the blade 32 (rotor blade 26) according to an embodiment to show the blade 32 (rotor blade 26) applied to the turbine 6 and the stator vane 24 provided in the vicinity of the upstream thereof. The stator vane of FIG. 6 includes an airfoil portion 92, an inner shroud 94 provided radially inward of the airfoil portion 92, and an outer shroud 96 provided radially outward of the airfoil portion 92. The outer shroud 96 is supported by the turbine casing 22.

As illustrated in FIG. 6, the upstream end surface 64 of the blade 32 (rotor blade 26) is provided to face a cavity (space) 98 between the rotor blade row formed by the blades 32 (rotor blades 26) having the upstream end surfaces 64 and the stator vane row formed by the stator vanes 24 provided adjacent to the blades 32 (rotor blades 26) in the upstream of the blades 32 (rotor blades 26). The downstream end surface 66 of the blade 32 (rotor blade 26) is provided to face a cavity (space) 99 between the rotor blade row formed by the blades 32 (rotor blades 26) having the downstream end surface 66 and the stator vane row formed by the stator vanes 24 (not shown in FIG. 6) provided adjacent to the blades 32 (rotor blade 26) in the downstream of the blades 32 (rotor blades 26).

As illustrated in FIGS. 2 to 5, the circumferential end surfaces 68 and 69 of the platform 38 are provided to face the circumferential end surfaces 69' and 68' of the platform 38' of the blade 32' (refer to the blade 32D' of FIG. 5) adjacent to the blade 32 having the platform 38 in the circumferential direction. Note that, herein, the "circumferential direction" refers to a circumferential direction of the rotor 8 perpendicular to the axial direction.

The end wall surface 62, the upstream end surface 64, the downstream end surface 66, and the circumferential end surfaces 68 and 69 constitute a surface of the platform 38 (connection member).

Note that, according to some embodiments, the blade 32 (such as the stator vane 24 or the rotor blade 26 of the turbine 6) may include an outer shroud (such as the outer shroud 96 of FIG. 6) provided radially outward of the airfoil portion or an inner shroud (such as the inner shroud 94 of FIG. 6) provided radially inward of the airfoil portion. In this case, the "connection member" may include the outer shroud or the inner shroud.

The communication hole 50 extending in the airfoil portion 40 and the platform 38 (connection member) has a first opening end 52 opened to the pressure surface 45 (airfoil surface) or the suction surface 46 (airfoil surface) of the airfoil portion 40 and a second opening end 54 opened to the surface of the platform 38.

Figure 2:
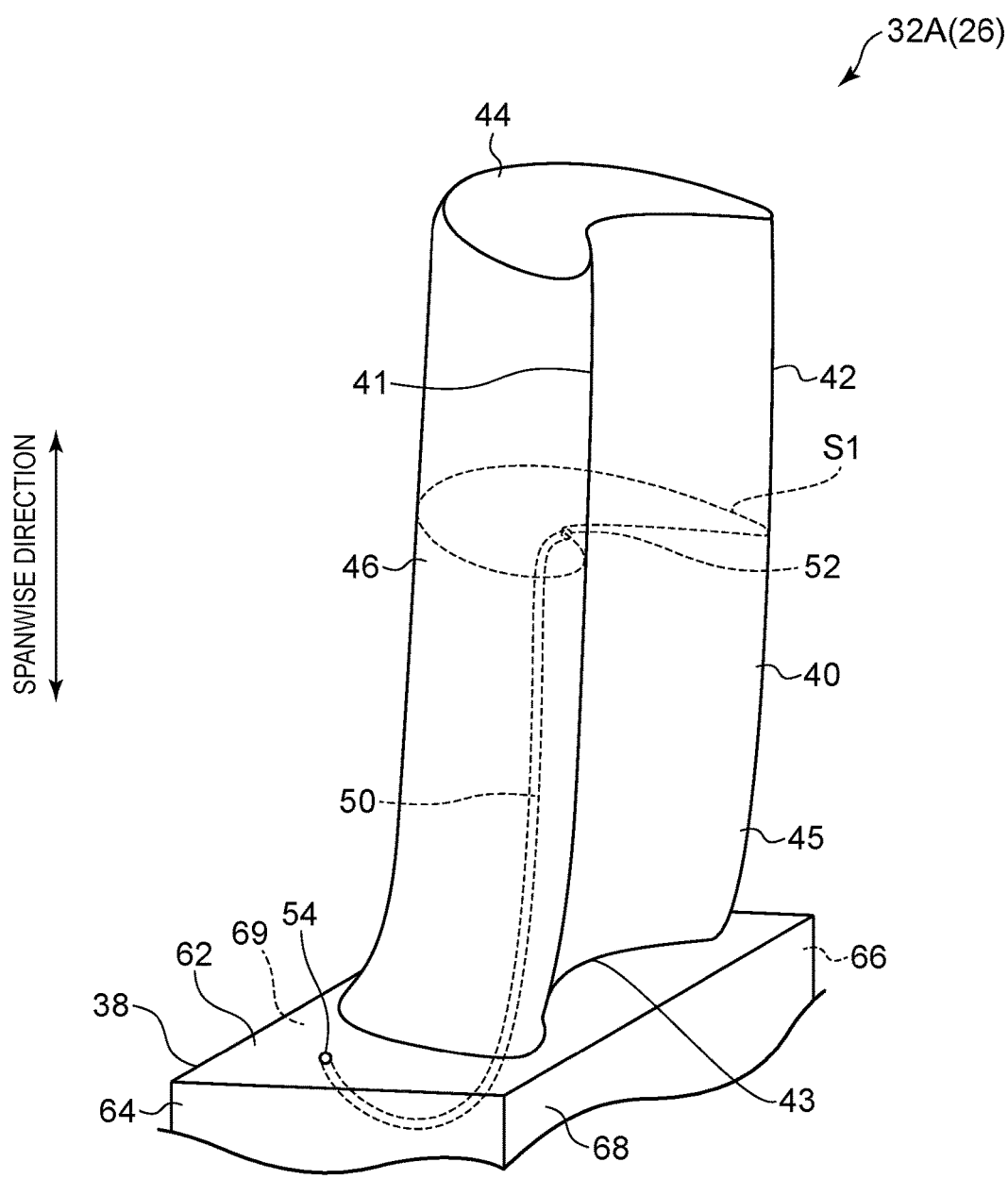
FIG. 2 is a schematic perspective view illustrating a blade (airfoil) according to an embodiment.

More specifically, in the blade 32A according to an exemplary embodiment illustrated in FIG. 2, the first opening end 52 is opened to the pressure surface 45 of the airfoil portion 40, and the second opening end 54 is opened to the end wall surface 62 of the platform 38. The second opening end 54 may be positioned in the upstream from the first opening end 52 in the chord direction of the airfoil portion 40. Alternatively, the second opening end 54 may be positioned in the upstream from the leading edge 41 of the airfoil portion 40 in the chord direction of the airfoil portion 40 on the cross-section S1 perpendicular to the spanwise direction through the position of the first opening end 52 in the spanwise direction.

Figure 3:
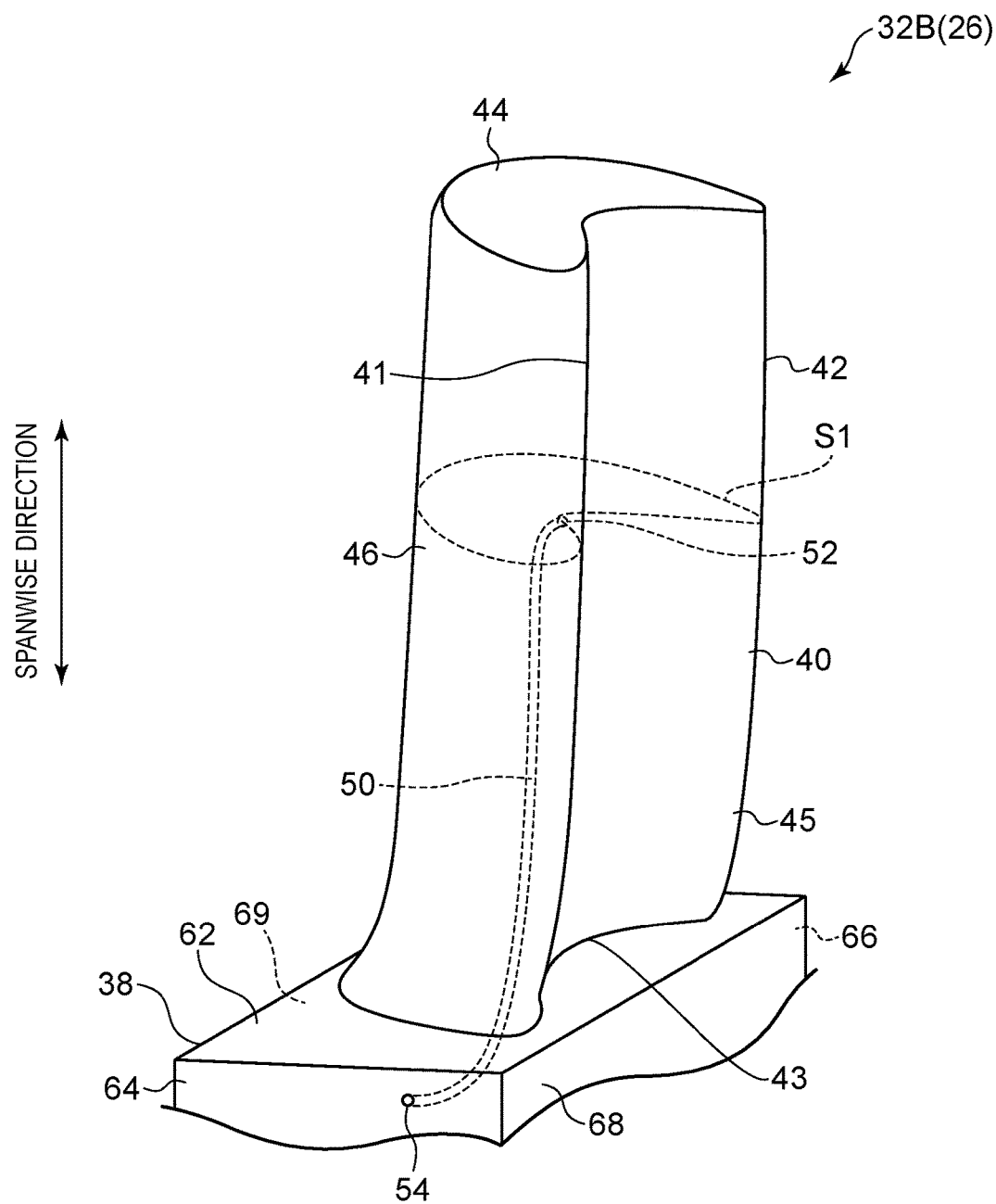
FIG. 3 is a schematic perspective view illustrating a blade (airfoil) according to an embodiment.

In the blade 32B according to an exemplary embodiment illustrated in FIG. 3, the first opening end 52 is opened to the pressure surface 45 of the airfoil portion 40, and the second opening end 54 is opened to the upstream end surface 64 of the platform 38.

Figure 4:
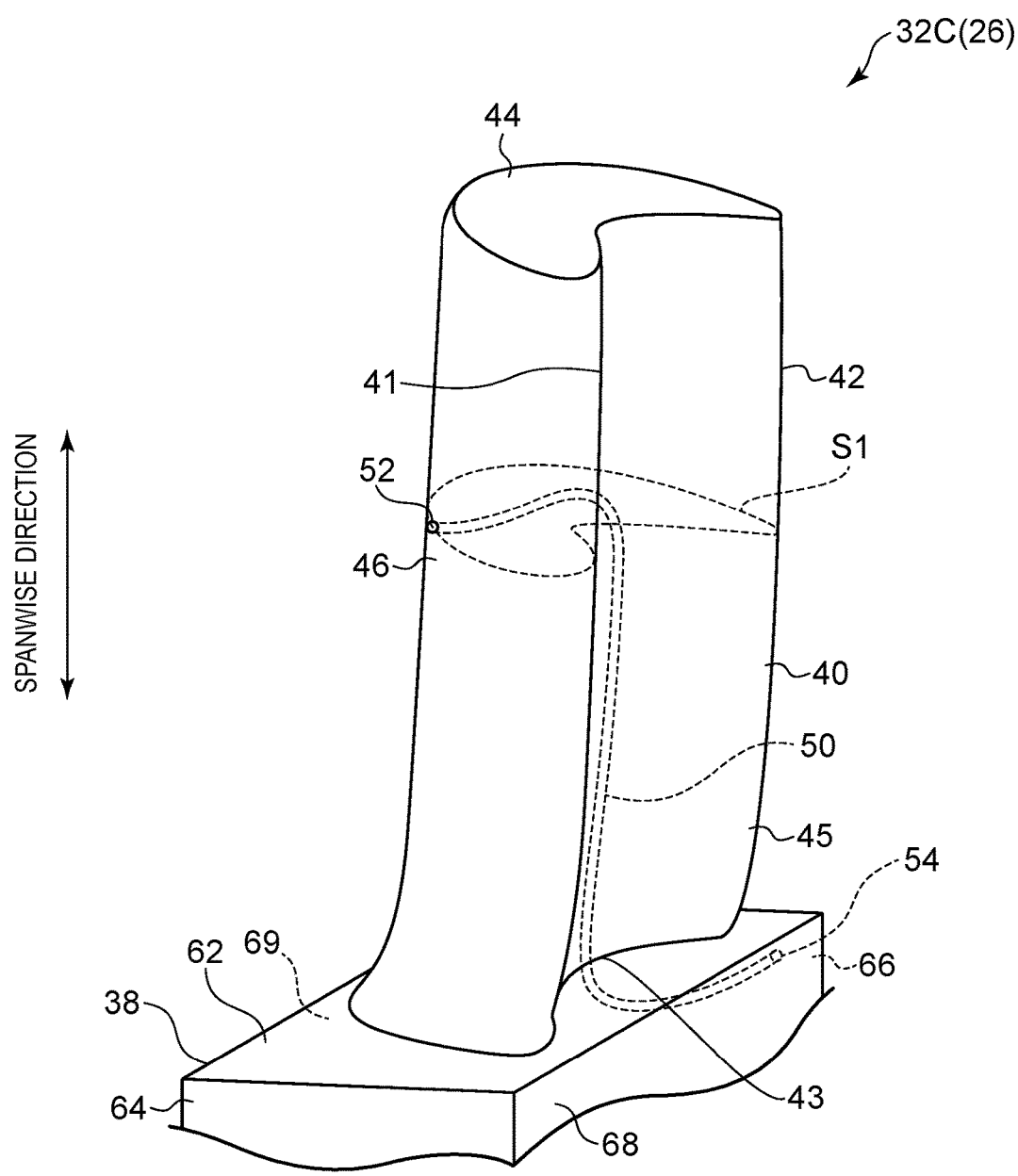
FIG. 4 is a schematic perspective view illustrating a blade (airfoil) according to an embodiment.

In the blade 32C according to an exemplary embodiment illustrated in FIG. 4, the first opening end 52 is opened to the suction surface 46 of the airfoil portion 40, and the second opening end 54 is opened to the downstream end surface 66 of the platform 38.

Figure 5:
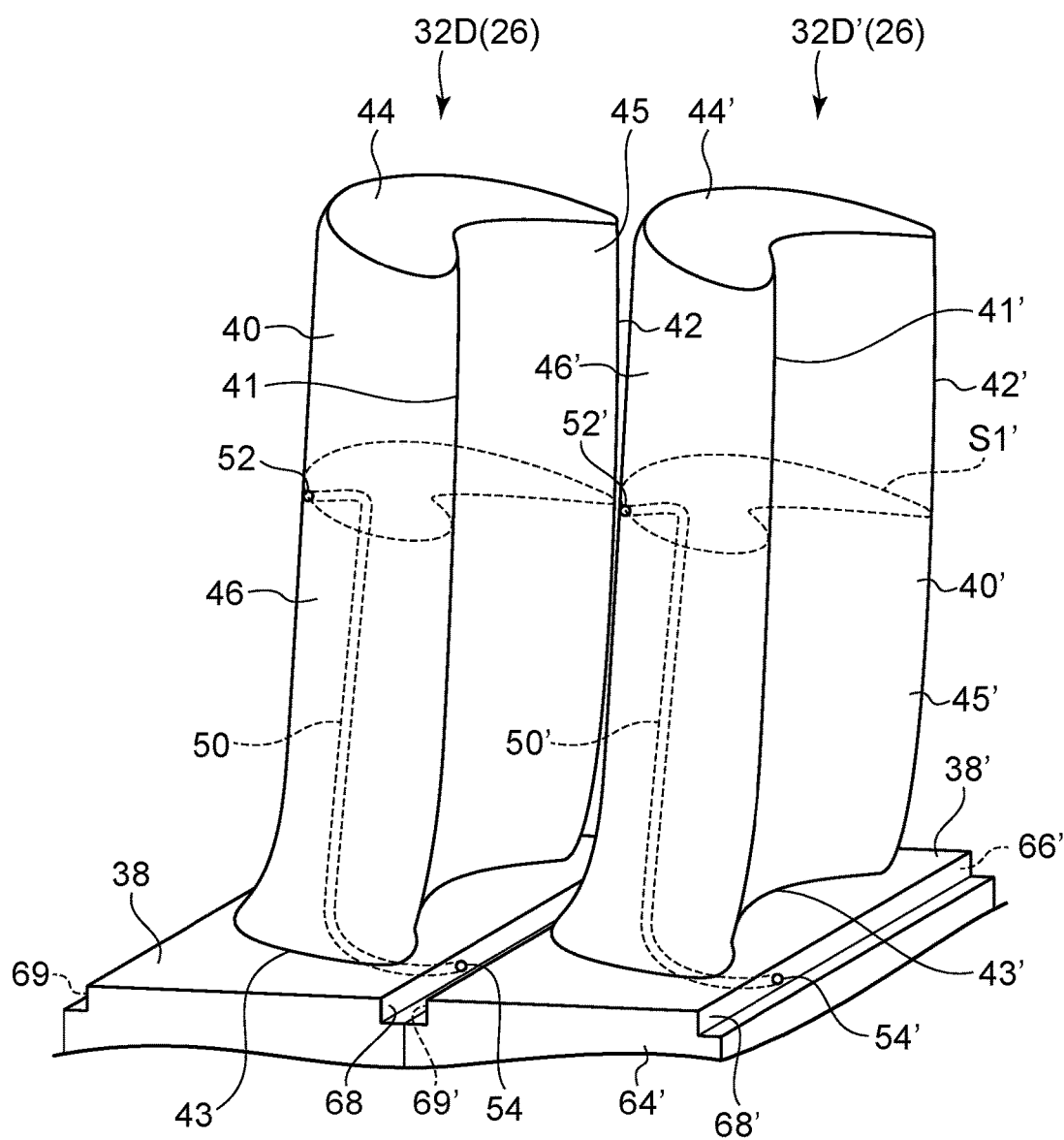
FIG. 5 is a schematic perspective view illustrating blades (airfoils) according to an embodiment.

According to an exemplary embodiment illustrated in FIG. 5, the circumferential end surface 68 of the platform 38 of the blade 32D and the circumferential end surface 69' of the platform 38' of the blade 32D' adjacent to the blade 32D are provided to at least partially face each other by interposing a gap in the circumferential direction.

In addition, the first opening end 52 is opened to the suction surface 46 of the airfoil portion 40, and the second opening end 54 is opened to the circumferential end surface 68 of the platform 38.

Note that the blade 32D' adjacent to the blade 32D in the circumferential direction has a configuration similar to that of the blade 32D, and apostrophe (') is added to the reference numeral denoting the element of the blade 32D' in FIG. 5.

Note that a combination of the opening position of the first opening end 52 and the opening position of the second opening end 54 is not limited to those illustrated in the drawings. For example, according to an embodiment, the first opening end 52 may be opened to the suction surface 46 of the airfoil portion 40, and the second opening end 54 may be opened to the end wall surface 62 of the platform 38. According to an embodiment, the first opening end 52 may be opened to the suction surface 46 of the airfoil portion 40, and the second opening end 54 may be opened to the upstream end surface 64 of the platform 38. According to an embodiment, the first opening end 52 may be opened to the pressure surface 45 of the airfoil portion 40, and the second opening end 54 may be opened to the downstream end surface 66 of the platform 38. According to an embodiment, the first opening end 52 may be opened to the pressure surface 45 of the airfoil portion 40, and the second opening end 54 may be opened to the circumferential end surface 68 of the platform 38.

Figure 7:
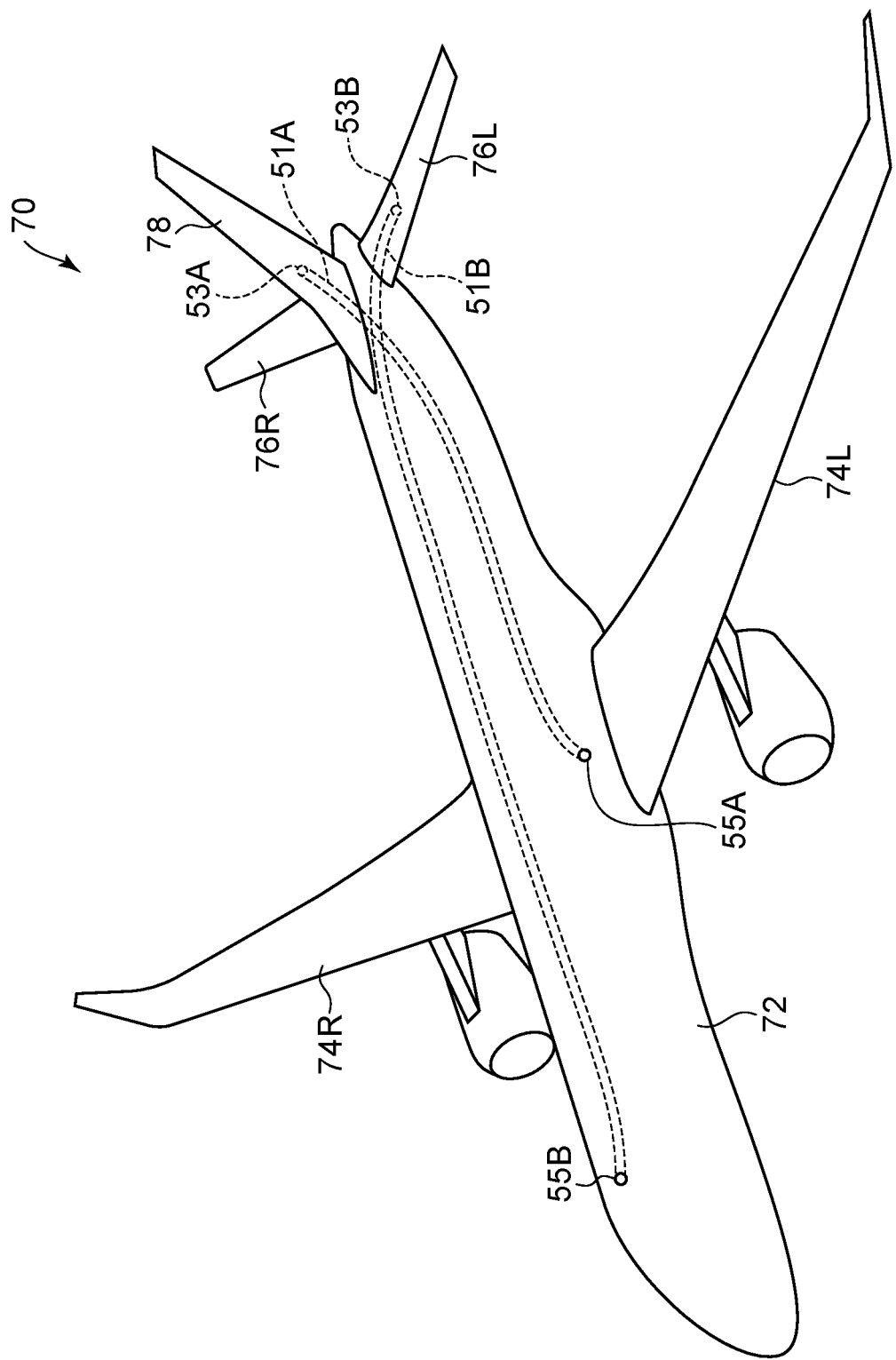
FIG. 7 is a schematic configuration diagram illustrating an aircraft according to an embodiment.

FIG. 7 is a schematic configuration diagram illustrating an aircraft according to an embodiment. As illustrated in FIG. 7, the aircraft 70 includes a fuselage 72, a pair of wings 74 (left wing 74L and right wing 74R), a pair of horizontal tails 76 (left horizontal tail 76L and right horizontal tail 76R), and a vertical tail 78. The wings 74, the horizontal tails 76, and the vertical tail 78 are mounted to the fuselage 72. In addition, the aircraft 70 has a communication hole 51A extending in the vertical tail 78 and the fuselage 72 and a communication hole 51B extending in the horizontal tails 76 and the fuselage 72. At least one of the left horizontal tail 76L, the right horizontal tail 76R, or the vertical tail 78 includes the airfoil according to the embodiment of the present invention.

Figure 8:
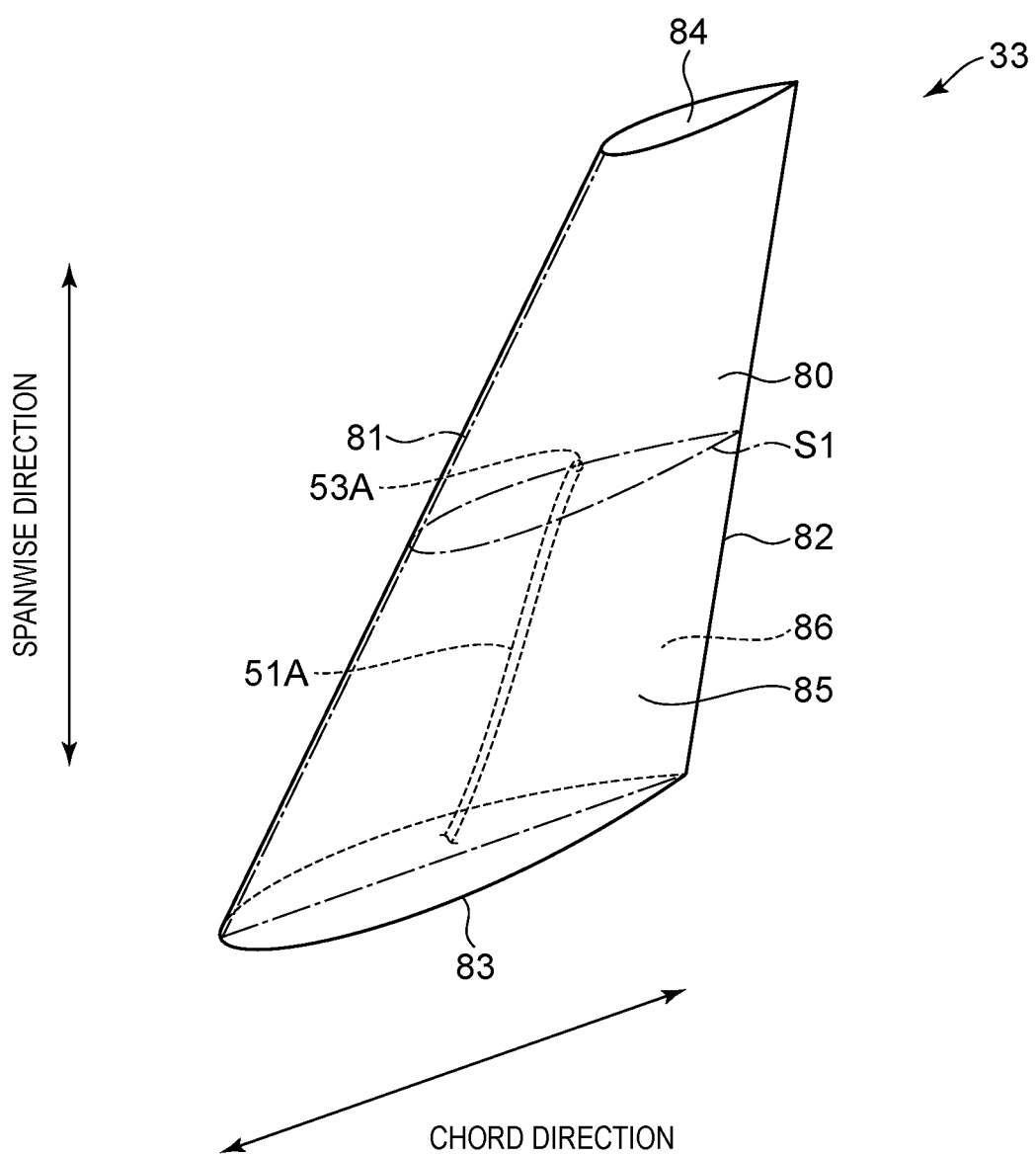
FIG. 8 is a schematic perspective view illustrating a fin (airfoil) according to an embodiment.

FIG. 8 is a schematic perspective view illustrating a fin (airfoil) 33 according to an embodiment (horizontal tail 76 or vertical tail 78). As illustrated in FIG. 8, the fin 33 according to an embodiment has an airfoil portion 80 extending between the base end 83 connected to the fuselage 72 and the tip 84 and a communication hole 51 (51A and 51B) passing through at least in the airfoil portion 80.

The airfoil portion 80 has a pair of airfoil surfaces 85 and 86 extending along the spanwise direction between the leading edge 81 and the trailing edge 82. If the fin 33 is the horizontal tail 76, a pair of airfoil surfaces 85 and 86 include an upper surface positioned in the upper half and a lower surface positioned in the lower half. If the fin 33 is the vertical tail 78, a pair of airfoil surfaces 85 and 86 include a left side surface positioned in the left half and a right side surface positioned in the right half.

As the airfoil portion 80 is viewed from the spanwise direction, each of the pair of airfoil surfaces 85 and 86 has a protruding shape protruding outward of the airfoil portion 80 from the inside. In the exemplary embodiment of FIG. 8, the airfoil portion 80 is a symmetrical fin in which the airfoil surfaces 85 and 86 are substantially symmetrical with respect to the chord line.

As illustrated in FIGS. 7 and 8, the communication hole 51 (51A or 51B) has a first opening end 53 (53A or 53B) opened to the airfoil surface 85 or 86 and extends in the airfoil portion 80 and the fuselage 72 to allow the first opening end 53 (53A or 53B) and the second opening end 55 (55A or 55B) formed in the fuselage 72 to communicate with each other.

According to some embodiments, for example, as illustrated in FIG. 7, the vertical tail 78 as a fin 33 has the communication hole 51A having the first opening end 53A opened to the right side surface (airfoil surface) of the vertical tail 78, and the second opening end 55A of the communication hole 51A is opened to the surface of the left-side portion of the fuselage 72.

Note that, although not shown in the drawing, the vertical tail 78 as a fin 33 may have a communication hole 51 having a first opening end 53 opened to the left side surface (airfoil surface) of the vertical tail 78. In this case, the second opening end 55 of the communication hole 51 is opened to the surface of the right-side portion of the fuselage 72.

According to some embodiments, for example, as illustrated in FIG. 7, the left horizontal tail 76L as a fin 33 has a communication hole 51B having a first opening end 53B opened to the lower surface (airfoil surface) of the left horizontal tail 76L, and the second opening end 55B of the communication hole 51B is opened to a surface of the fuselage 72. The second opening end 55B may be opened to the upper surface of the fuselage 72. In addition, the second opening end 55B may be provided in a front part of the fuselage 72, for example, ahead of the wing 74.

Note that, similarly, the first opening end 53 may be provided in the right horizontal tail 76R, and a communication hole 51 that allows the first opening end 53 and the second opening end 55 formed in the fuselage 72 to communicate with each other may also be provided.

Although not shown in the drawing, according to some embodiments, the left horizontal tail 76L as a fin 33 may have a communication hole 51 having a first opening end 53 opened to the upper surface (airfoil surface) of the left horizontal tail 76L. In this case, the second opening end 55 of the communication hole 51 may be opened to the lower surface of the fuselage 72. In addition, the second opening end 55 may be provided in a front part of the fuselage 72, for example, ahead of the wing 74.

Similarly, the right horizontal tail 76R may have a first opening end 53, and a communication hole 51 that allows the first opening end 53 and the second opening end 55 formed in the fuselage 72 to communicate with each other may also be provided.

Hereinafter, the blade (airfoil) 32 (such as a blade of the turbine 6) and the fin (airfoil) 33 (such as a tail of the aircraft 70) according to some embodiments will be described in more details.

Figure 9:
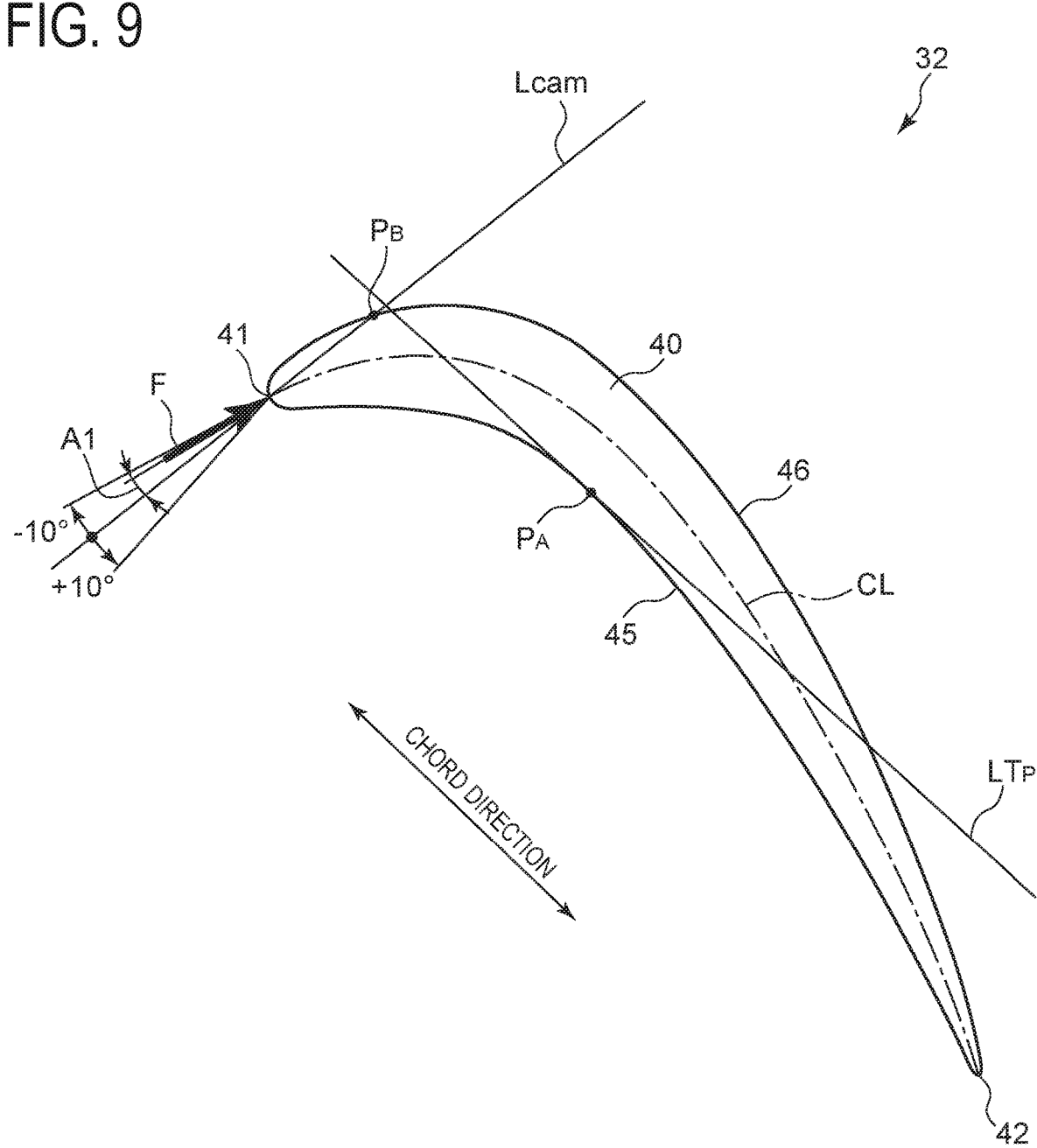
FIG. 9 is a cross-sectional view illustrating a blade (airfoil) according to an embodiment.
Figure 10:
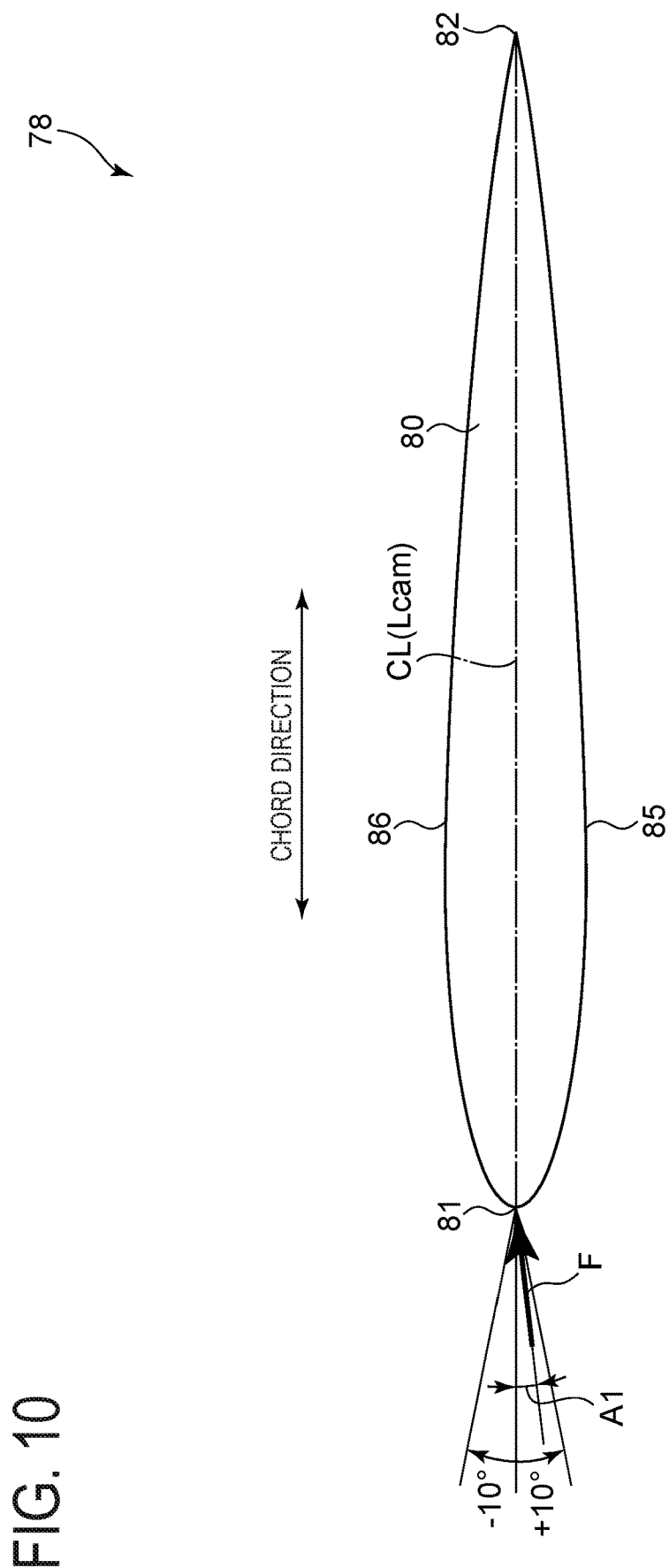
FIG. 10 is a cross-sectional view illustrating a fin (airfoil) according to an embodiment.

FIG. 9 is a cross-sectional view illustrating the blade 32 according to an embodiment, and shows a cross-section perpendicular to the spanwise direction through the first opening end 52 (see FIGS. 2 to 5). FIG. 10 is a cross-sectional view illustrating the fin 33 according to an embodiment, and shows a cross-section perpendicular to the spanwise direction through the first opening end 53 (see FIG. 8).

On a cross-section 51 perpendicular to the spanwise direction through the position of the first opening end 52 or 53 in the spanwise direction, the blade 32 (see FIG. 9) or the fin 33 (see FIG. 10) according to some embodiments has an angle A1 satisfying a condition (a) within an angle range equal to or larger than −10 degrees and equal to or smaller than 10 degrees with respect to an extension line obtained by extending the camber line CL of the airfoil portion 40 or 80 from the leading edge 41 or 81 while setting the leading edge 41 or 81 as a center. Here, the condition (a) is a condition that, when the airfoil portion 40 or 80 receives a flow of the fluid from a direction of the angle A1 toward the leading edge 41 or 81 (that is, the arrow direction F in FIGS. 9 and 10), a static pressure at the position of the first opening end 52 or 53 becomes equal to a static pressure at the position of the second opening end 54 or 55.

Note that the "extension line" described above refers to a front part from the leading edge 41 or 81 (the part opposite to the trailing edge 42 or 82 with respect to the leading edge 41 or 81) on a straight line Lcam parallel to the camber line CL of the leading edge 41 or 81 through the leading edge 41 or 81 (the straight line having a slope of the camber line CL on the leading edge 41). Note that, if the fin 33 is symmetrical as illustrated in FIG. 10, the chord line matches the camber line CL, and the straight line Lcam having the slope of the camber line CL on the leading edge 81 matches the camber line CL.

The fluid flow direction is a relative direction with respect to the blade 32 or fin 33. That is, when the blade 32 or fin 33 rotates along with the rotor of the rotary machine, the fluid flow direction described above depends on a circumferential speed of the blade 32 or fin 33 or a flow rate of the fluid. In addition, if the blade 32 or fin 33 is applied to the aircraft, the fluid flow direction described above depends on a direction (wind direction) of the fluid (typically, the air) around the aircraft, a travel direction or a flight speed of the aircraft, or the like.

In the following description, an angle of the fluid flow directed to the blade 32 or fin 33 with respect to the direction of the operation condition of the design point (typically, the extension line of the camber line CL) is referred to as an incidence angle (angle of attack). That is, in the case of the operation condition of the design point, the incidence angle becomes zero. In addition, the incidence angle is set to "positive" when the fluid flow faces the pressure surface 45 or the airfoil surface 85 with respect to the leading edge 41 or 81 relative to the case of the design point. That is, in FIGS. 9 and 10, with respect to the leading edge 41 or 81, the incidence angle is set to "positive" for a counterclockwise direction or "negative" for a clockwise direction.

Note that, if the gas turbine 1 (see FIG. 1) is operated with a load smaller than that of the operation condition of the design point, the incidence angle of the fluid against the rotor blade 26 as the blade 32 tends to be negative. If it is operated with a load larger than that of the operation condition of the design point, the incidence angle described above tends to be positive.

Effects obtained using the blade 32 and fin 33 having the aforementioned configurations will be described hereinafter on the basis of the exemplary embodiments of FIGS. 2 and 4. However, they may similarly apply to the effects of other embodiments.

Figure 11:
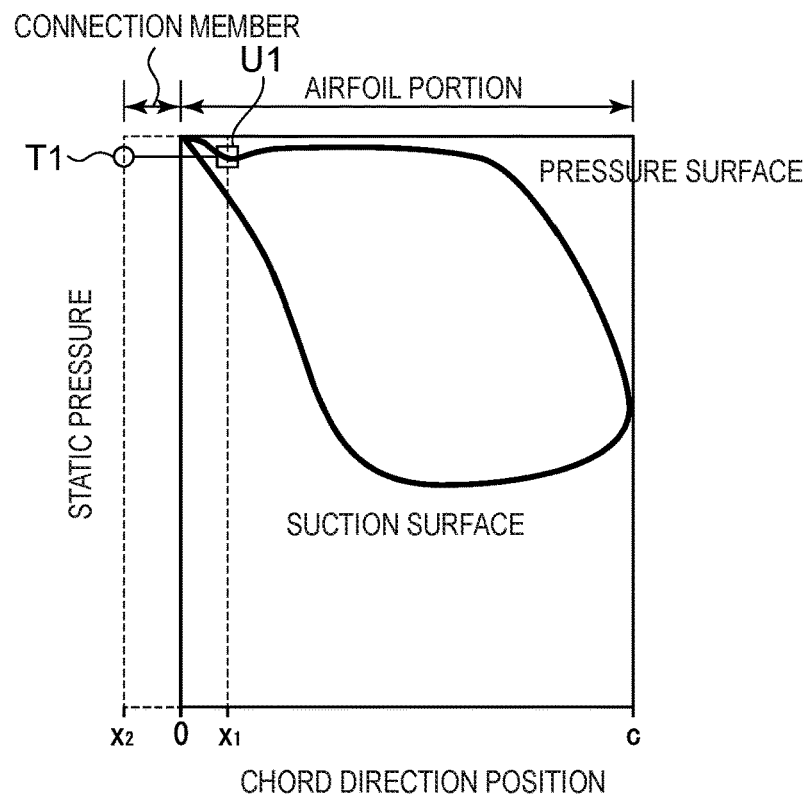
FIG. 11 is a graph illustrating an exemplary static pressure distribution on an airfoil surface under an operation condition at a design point of a gas turbine having the blade of FIG. 2.
Figure 12:
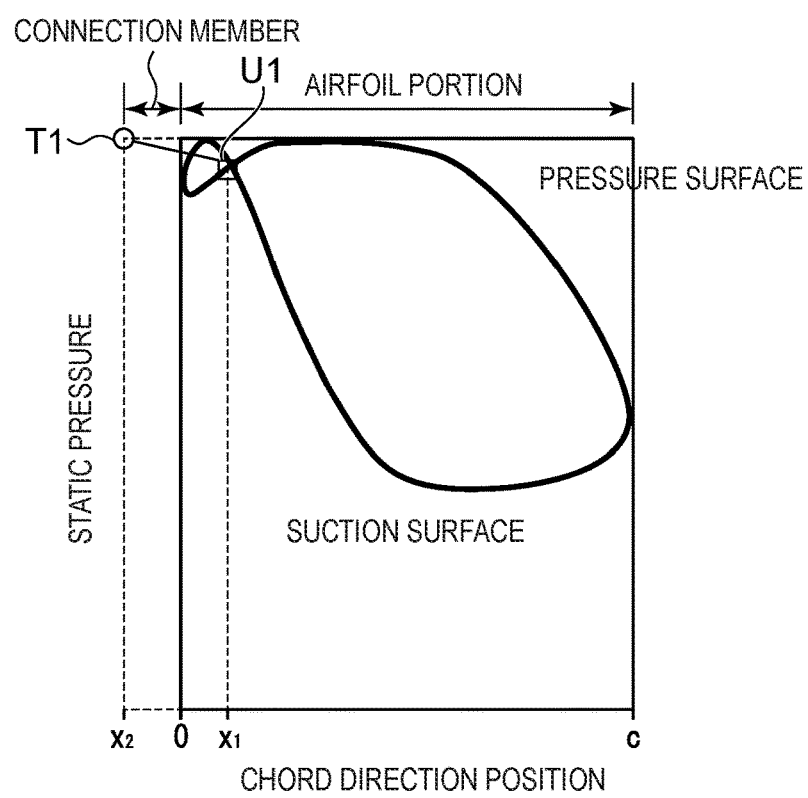
FIG. 12 is a graph illustrating an exemplary static pressure distribution on an airfoil surface under an operation condition deviated from the design point of the gas turbine having the blade of FIG. 2.

FIGS. 11 and 12 are graphs illustrating exemplary static pressure distributions on airfoil surfaces having different operation conditions (that is, on the pressure surface 45 and the suction surface 46) when the blade 32 of FIG. 2 is applied as the rotor blade 26 of the gas turbine 1 (see FIG. 1). FIG. 11 is a graph of the static pressure distribution under the operation condition of the design point (that is, at an incidence angle of 0 degrees). In addition, FIG. 12 is a graph of the static pressure distribution when the operation condition is deviated from the design point, and the incidence angle of the fluid is negative.

Note that the abscissas of FIGS. 11 and 12 refer to the position in the chord direction, in which the position of the leading edge 41 of the airfoil portion 40 is denoted by "0", and the position of the trailing edge 42 is denoted by "c". In addition, the position of the first opening end 52 provided on the airfoil surface is denoted by "U1", and the position of the chord direction is denoted by "x1".

In the graphs of FIGS. 11 and 12, the position of the second opening end 54 (indicated by "T1") provided on the end wall surface 62 of the platform 38 (connection member) is also plotted. In the graphs of FIGS. 11 and 12, the chord direction position x2 of the second opening end 54 is smaller than zero. This means that the second opening end 54 on the end wall surface 62 is placed in the upstream from the leading edge 41 of the airfoil portion 40.

The static pressure distribution on the airfoil surface under the operation condition of the design point (that is, at an incidence angle of 0 degrees) typically has a profile shown in the graph of FIG. 11, including a position on the airfoil surface (pressure surface 45 or suction surface 46) having the same static pressure and a position on the end wall surface 62 of the platform 38. For example, in the graph of FIG. 11, the static pressure under the operation condition of the design point becomes equal between the position U1 on the pressure surface 45 and the position T1 on the end wall surface 62.

Therefore, in the case of the communication hole 50 having the first opening end 52 provided at the position U1 on the pressure surface 45 and the second opening end 54 provided at the position T1 on the end wall surface 62, basically, a flow of the fluid passing through the communication hole 50 is not generated in the operation of the design point.

Meanwhile, in a mechanical machine such as a rotary machine using the blade 32 having such characteristics, when the operation condition is deviated from the design point, and the incidence angle of the fluid directed to the blade 32 is deviated to the negative direction from the design point, the flow of the fluid easily collides with the suction surface 46, and flow separation easily occurs in the flow on the pressure surface 45.

In this case, as illustrated in FIG. 12, the static pressure distribution on the airfoil surface has a pressure difference between the position U1 on the pressure surface 45 and the position T1 on the end wall surface 62, whose pressures are equal under the operation condition of the design point, so that the pressure at the position T1 on the end wall surface 62 becomes a relative high pressure. Therefore, by providing the communication hole 50 having the first opening end 52 provided at the position U1 on the pressure surface 45 and the second opening end 54 provided at the position T1 on the end wall surface 62, a flow passing through the communication hole 50 from the second opening end 54 having a relatively high pressure to the first opening end 52 having a relatively low pressure is generated when the incidence angle of the fluid directed to the blade 32 is deviated to the negative direction from the design point. In addition, as this flow is output to the pressure surface 45 through the first opening end 52, momentum is supplied to the flow (main flow) around the pressure surface 45, so that it is possible to suppress flow separation that may occur on the pressure surface 45.

Figure 13:
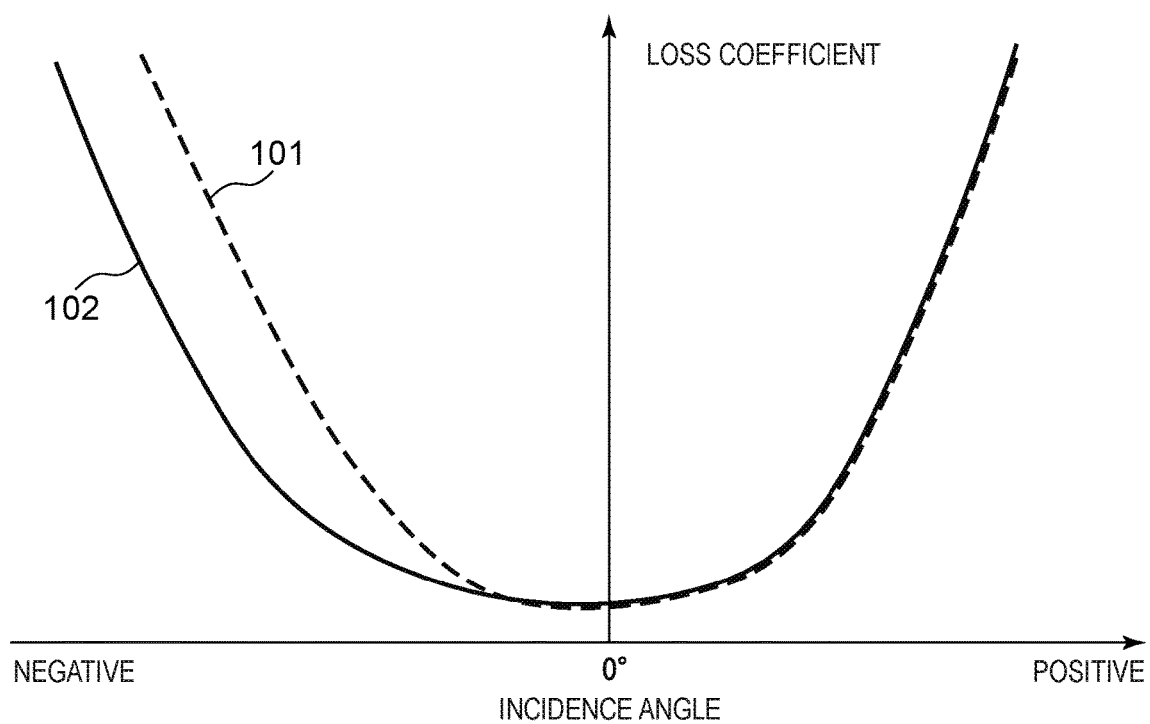
FIG. 13 is a graph illustrating an exemplary relationship between a loss coefficient and an incidence angle of the blade.

Therefore, if the communication hole 50 described above is provided as illustrated in FIG. 13, it is possible to reduce a loss coefficient of the blade 32 in the negative incidence angle region, compared to a case where the communication hole 50 is not provided. Note that FIG. 13 is a graph illustrating an exemplary relationship between the loss coefficient of the blade 32 and the incidence angle by comparing the loss coefficient 102 of the blade 32 having the communication hole 50 and the loss coefficient 101 of the blade 32 having no communication hole 50.

Figure 14:
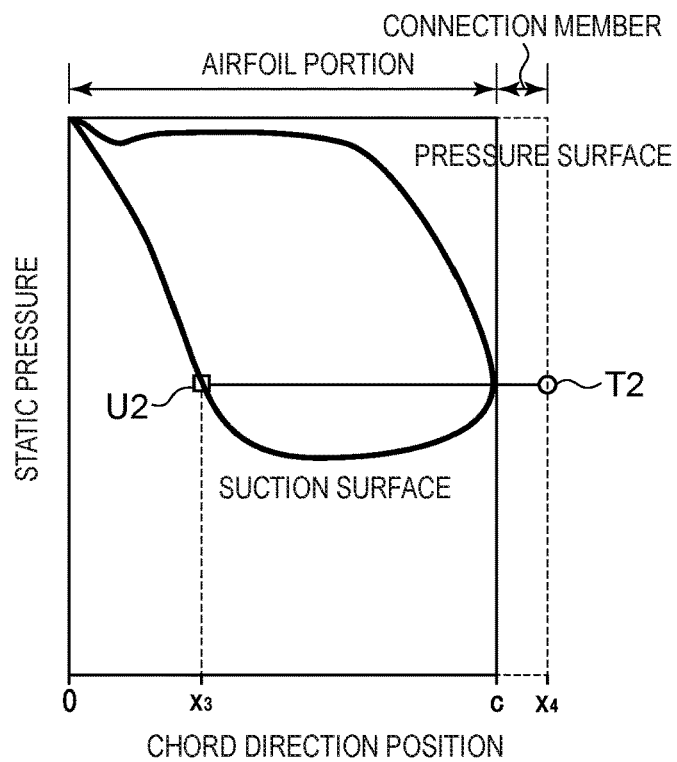
FIG. 14 is a graph illustrating an exemplary static pressure distribution on an airfoil surface under an operation condition at a design point of the gas turbine having the blade of FIG. 4.
Figure 15:
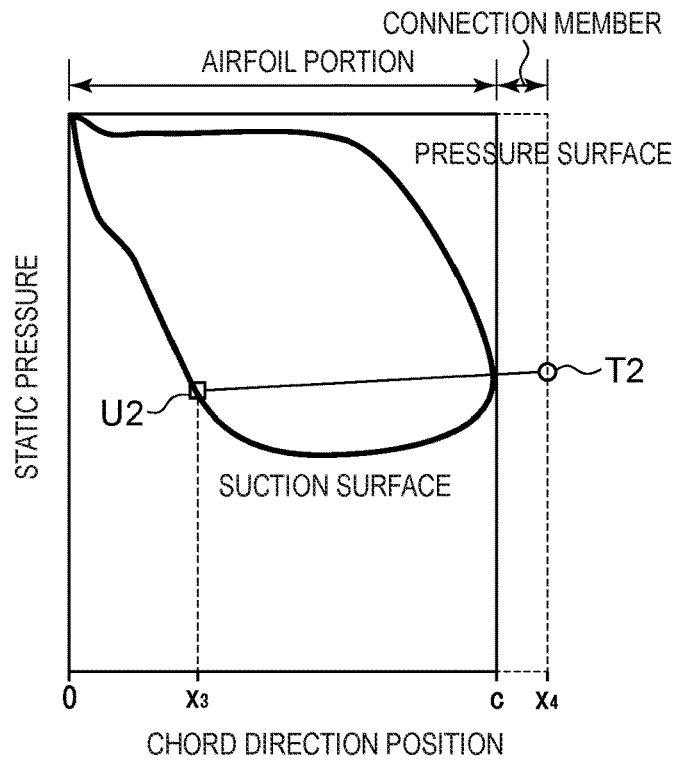
FIG. 15 is a graph illustrating an exemplary static pressure distribution on an airfoil surface under an operation condition deviated from a design point of the gas turbine having the blade of FIG. 4.

FIGS. 14 and 15 are graphs illustrating exemplary static pressure distributions on the airfoil surfaces (that is, on the pressure surface 45 and the suction surface 46) under different operation conditions when the blade 32 of FIG. 4 is applied as the rotor blade 26 of the gas turbine 1 (see FIG. 1). FIG. 14 is a graph under the operation condition of the design point (that is, at an incidence angle of 0 degrees). In addition, FIG. 15 is a graph when the operation condition is deviated from the design point, and the incidence angle of the fluid becomes positive.

Note that the abscissas of the graphs of FIGS. 14 and 15 refer to the position of the chord direction, in which the position of the leading edge 41 of the airfoil portion 40 is denoted by "0", and the position of the trailing edge 42 is denoted by "c". In addition, the position of the first opening end 52 provided on the airfoil surface is denoted by "U2", and the position of the chord direction is denoted by "x3".

In the graphs of FIGS. 14 and 15, the position (denoted by "T2") of the second opening end 54 provided on the downstream end surface 66 of the platform 38 (connection member) is also plotted. In the graphs of FIGS. 14 and 15, the chord direction position "x4" of the second opening end 54 is larger than the chord direction position "c". This means that the second opening end 54 on the downstream end surface 66 is located downstream from the trailing edge 42 of the airfoil portion 40.

The static pressure distribution on the airfoil surface under the operation condition of the design point (that is, at an incidence angle of 0 degrees) typically has a profile illustrated in the graph of FIG. 14, including a position on the airfoil surface (pressure surface 45 or suction surface 46) and a position on the downstream end surface 66 of the platform 38 having the same static pressure. For example, in the graph of FIG. 14, the position U2 on the suction surface 46 and the position T2 on the downstream end surface 66 have the same static pressure under the operation condition of the design point.

Therefore, in the case of the communication hole 50 having the first opening end 52 provided at the position U2 on the suction surface 46 and the second opening end 54 provided at the position T2 on the downstream end surface 66, basically, a flow of the fluid passing through the communication hole 50 is not generated in the operation of the design point.

Meanwhile, in a mechanical machine such as a rotary machine using the blade 32 having such characteristics, when the operation condition is deviated from the design point, and the incidence angle of the fluid directed to the blade 32 is deviated in a positive direction from the design point, the flow of the fluid easily collides with the pressure surface 45, and flow separation easily occurs in the flow on the suction surface 46.

In this case, as illustrated in FIG. 15, the static pressure distribution on the airfoil surface has a pressure difference between the position U2 on the suction surface 46 and the position T2 on the downstream end surface 66, whose pressures are equal under the operation condition of the design point, so that the pressure at the position T2 on the downstream end surface 66 becomes relatively higher. Therefore, by providing the communication hole 50 having the first opening end 52 at the position U2 on the suction surface 46 and the second opening end 54 at the position T2 on the downstream end surface 66, a flow passing through the communication hole 50 from the second opening end 54 having a relatively high pressure to the first opening end 52 having a relatively low pressure is generated when the incidence angle of the flow directed to the blade 32 is deviated to the positive direction from the design point. In addition, as this flow is output to the suction surface 46 through the first opening end 52, momentum is supplied to the flow (main flow) around the suction surface 46, so that it is possible to suppress flow separation that may occur on the suction surface 46.

Figure 16:
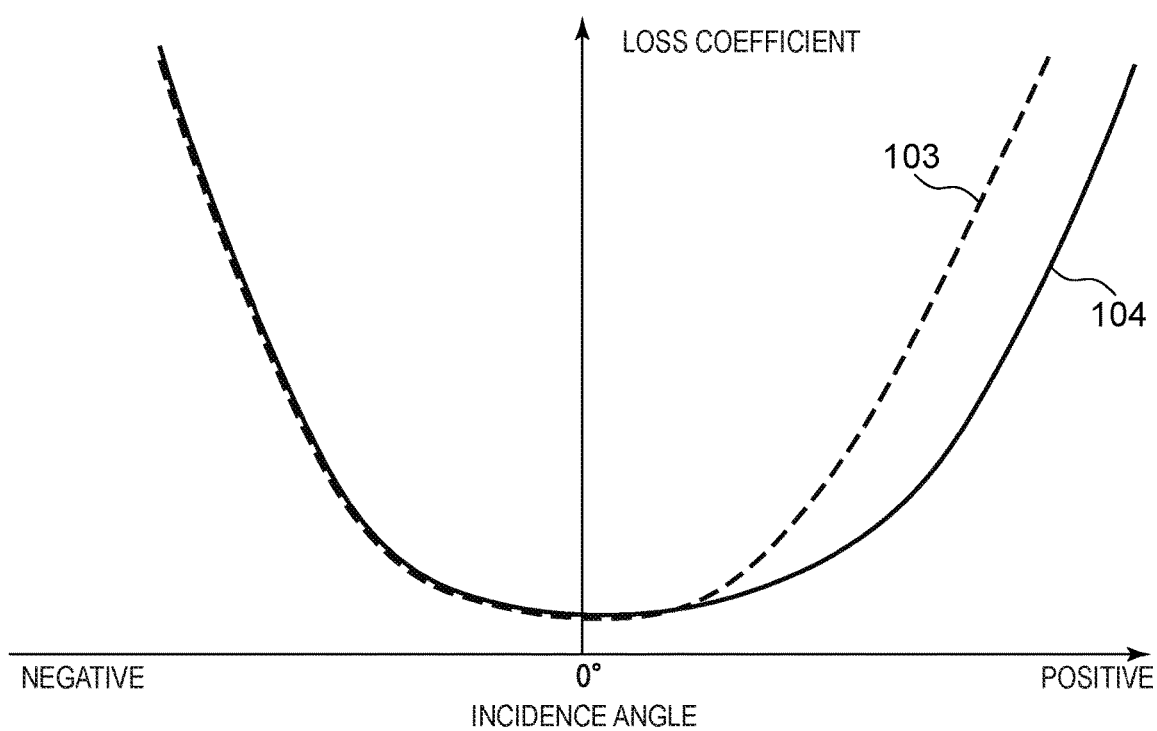
FIG. 16 is a graph illustrating an exemplary relationship between a loss coefficient and an incidence angle of a blade (airfoil).

Therefore, if the communication hole 50 described above is provided as illustrated in FIG. 16, it is possible to reduce a loss coefficient of the blade 32 in the positive incidence angle region, compared to a case where the communication hole 50 is not provided. Note that FIG. 16 is a graph illustrating an exemplary relationship between the loss coefficient of the blade 32 and the incidence angle by comparing the loss coefficient 104 of the blade 32 having the communication hole 50 and the loss coefficient 103 of the blade 32 having no communication hole 50.

As recognized from the aforementioned description, the blade 32 or fin 33 according the embodiment described above has an angle A1 satisfying the condition (a). Therefore, the static pressure becomes equal between the position of the first opening end 52 or 53 on the airfoil surface and the position of the second opening end 54 or 55 in the operation of the design point of the mechanical machine (such as the gas turbine 1 or the aircraft 70). In addition, when the operation state of the mechanical machine is deviated from the design point, a pressure difference is generated between the position of the first opening end 52 or 53 and the position of the second opening end 54 or 55.

For this reason, there is substantially no pressure difference between the first opening end 52 or 53 and the second opening end 54 or 55, and a flow passing through the communication hole 50 or 51 is not basically generated under the operation condition in the vicinity of the design point of the mechanical machine. Meanwhile, if the operation condition is deviated from the design point (that is, if the incidence angle of the fluid is deviated from the angle A1), a pressure difference is generated between the position of the first opening end 52 or 53 and the position of the second opening end 54 or 55. As a result, a flow passing through the communication hole 50 or 51 is generated from one of the opening ends of the high-pressure side to the other opening end of the low-pressure side. In addition, as this flow is output from the opening end of low-pressure side, momentum is supplied to the flow (main flow) around the surface of the member provided with the opening end of the low-pressure side (typically, airfoil portion 40 or 80), so that it is possible to suppress flow separation that may occur on this surface.

Therefore, it is possible to suppress performance degradation of the mechanical machine in the operation in the vicinity of the design point and suppress flow separation on the airfoil surface that may occur when the operation condition is deviated from the design point.

Note that, in the embodiment of FIG. 7, the second opening end 55A of the communication hole 51A having the first opening end 53A on the surface (for example, the right side surface) of the vertical tail 78 (fin 33) may be placed over the base end in the vicinity of the base end (connecting portion to the fuselage 72) of the wing 74 (for example, the left wing 74L) in the fuselage 72.

In the embodiment of FIG. 7, the second opening end 55B of the communication hole 51B having the first opening end 53B on the surface (for example, the lower surface) of the horizontal tail 76 (fin 33) may be provided on the upper surface of the fuselage 72 ahead of the wing 74 in the fuselage 72.

In any case, the first opening end 53 and the second opening end 55 of the communication hole 51 are provided in positions where the pressures become equal in the operation in the vicinity of the design point of the aircraft 70 (for example, flight at a cruising speed).

The blade 32 and/or fin 33 according to some embodiments may further have the following characteristics.

According to some embodiments, the first opening end 52 of the blade 32 is opened to the pressure surface 45 in the leading edge 41 side from a point $P_A$ (see FIG. 9) on the pressure surface 45 having a tangential line $LT_P$ (see FIG. 9) parallel to the chord direction of the airfoil portion 40.

In the mechanical machine (such as the gas turbine 1) having the blade 32, if the incidence angle of the fluid against the blade 32 is negative (that is, the fluid flow is directed to easily collide with the suction surface 46, compared to the operation condition of the design point), flow separation easily occurs on the pressure surface 45 in the position of the trailing edge 42 side from the point $P_A$ on the pressure surface 45 having a tangential line $LT_P$ parallel to the chord direction in some cases. In this regard, according to the embodiment described above, the first opening end 52 is provided in the leading edge 41 side from the position where flow separation easily occurs on the pressure surface 45 in this manner. Therefore, it is possible to effectively suppress fluid separation that may easily occur on the pressure surface 45 when the incidence angle described above is negative.

According to some embodiments, the first opening end 52 of the blade 32 is opened to the suction surface 46 at a position of the leading edge 41 side from the intersecting point $P_B$ between the suction surface 46 and the straight line Lcam through the leading edge 41 and parallel to the camber line CL of the airfoil portion 40 in the leading edge 41.

In the mechanical machine (such as the gas turbine 1) having the blade 32, if the incidence angle of the fluid against the blade 32 is positive (that is, the flow of the fluid is directed to collide with the pressure surface 45, compared to the operation condition of the design point), flow separation easily occurs on the suction surface 46 at a position of the trailing edge 42 side from the intersecting point $P_B$ between the suction surface 46 and the straight line Lcam through the leading edge 41 and parallel to the camber line CL of the airfoil portion 40 in the leading edge 41 in some cases. In this regard, according to the embodiment described above, the second opening end 54 is provided in the leading edge 41 side from the position where flow separation easily occurs on the suction surface 46 in this manner. Therefore, it is possible to effectively suppress fluid separation that may easily occur on the suction surface 46 when the incidence angle described above is positive.

Figure 17:
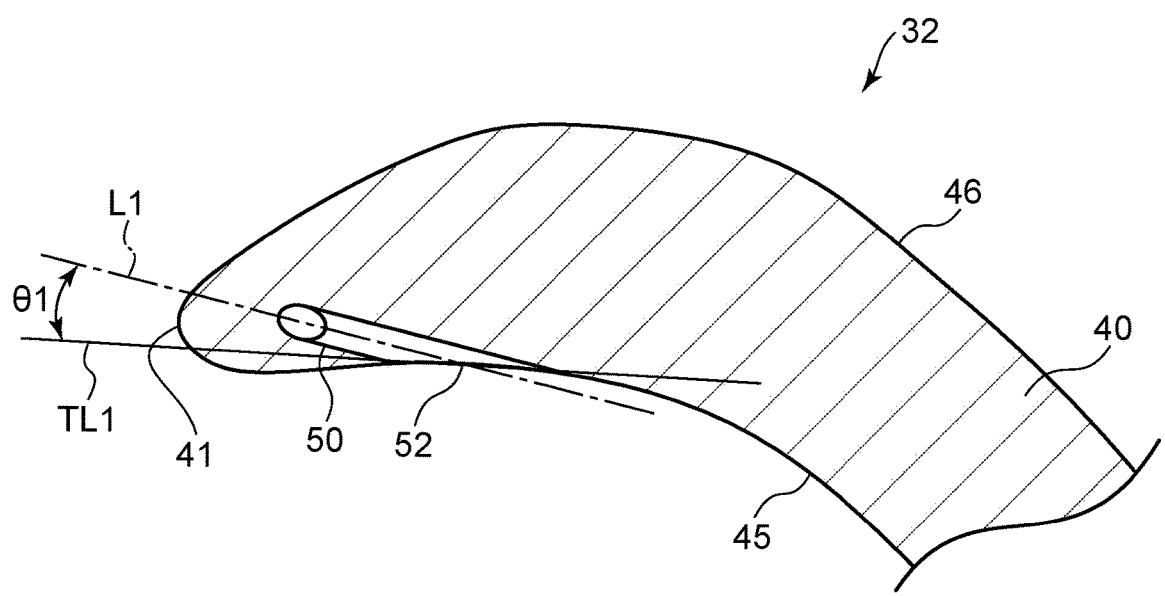
FIG. 17 is a partial cross-sectional view illustrating a blade (airfoil) according to an embodiment.
Figure 18:
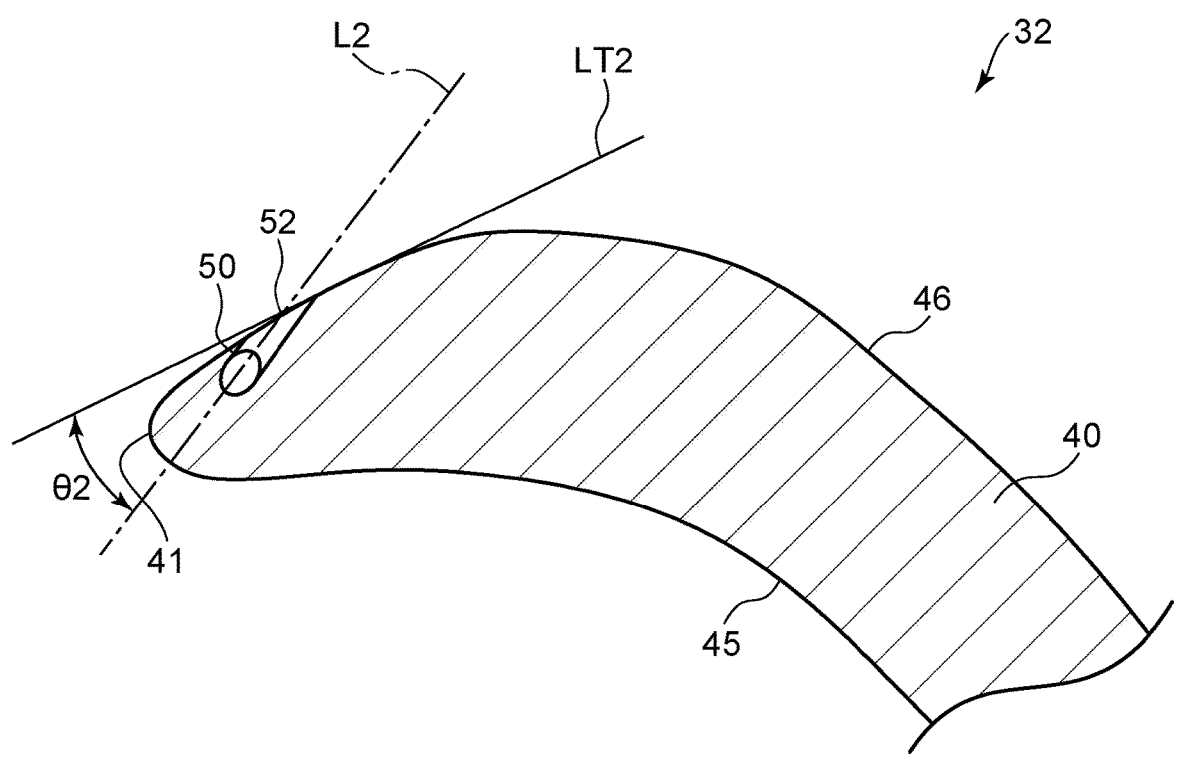
FIG. 18 is a partial cross-sectional view illustrating a blade (airfoil) according to an embodiment.

Each of FIGS. 17 and 18 is a partial cross-sectional view illustrating the blade according to an embodiment to show a cross section perpendicular to the spanwise direction through the first opening end 52.

According to some embodiments, as the blade 32 or fin 33 is viewed from the spanwise direction, an angle between a portion of the tangential line of the airfoil surface in the first opening end 52 or 53 close to the leading edge 41 or 81 side from the first opening end 52 or 53 and the communication hole 50 or 51 in the first opening end 52 or 53 is equal to or smaller than 45 degrees.

For example, in the exemplary embodiment of FIG. 17, the first opening end 52 of the communication hole 50 is opened to the pressure surface 45, and an angle θ1 between a portion of the tangential line TL1 of the first opening end 52 on the pressure surface 45 (airfoil surface) close to the leading edge 41 side from the first opening end 52 and the communication hole 50 in the first opening end 52 (the direction of the straight line L1 in the drawing) is equal to or smaller than 45 degrees.

For example, according to the exemplary embodiment of FIG. 18, the first opening end 52 of the communication hole 50 is opened to the suction surface 46, and an angle θ2 between a portion of the tangential line TL2 of the first opening end 52 on the suction surface 46 (airfoil surface) close to the leading edge 41 side from the first opening end 52 and the communication hole 50 in the first opening end 52 (the direction of the straight line L2 in the drawing) is equal to or smaller than 45 degrees.

In the case of the embodiment described above, the communication hole 50 or 51 has a shape matching the airfoil surface (pressure surface 45 or suction surface 46) at the position of the first opening end 52 or 53. Therefore, it is possible to reduce a mixing loss with the fluid flowing along the vicinity of the airfoil surface when the flow from the communication hole 50 or 51 is output from the first opening end 52 or 53.

While the embodiment of the present invention has been described, the present invention is not limited to the above-described embodiments but includes modifications of the above-described embodiments and appropriate combinations of these modifications.

In the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same" "equal" and "uniform" shall not be construed as indicating only the state in which the feature is strictly equal, but also includes a state in which there is a tolerance or a difference that can still achieve the same function.

Furthermore, in the present specification, an expression of a shape such as a rectangular shape or a cylindrical shape shall not be construed as only the geometrically strict shape, but also includes a shape with unevenness or chamfered corners within the range in which the same effect can be achieved.

Furthermore, in the present specification, an expression such as "comprise", "include" and "have" are not intended to be exclusive of other components.

The invention claimed is:

1. An airfoil comprising:
   an airfoil portion having an airfoil surface extending along a spanwise direction between a leading edge and a trailing edge; and
   at least one communication hole extending at least in the airfoil portion and having a first opening end opened to the airfoil surface, through which the first opening end is communicated with a second opening end provided in a portion of the airfoil other than the airfoil portion or a device on which the airfoil is installed,
   wherein, on a cross-section perpendicular to the spanwise direction through a position of the first opening end of the spanwise direction, an angle A1 satisfying a condition (a) exists within an angle range equal to or larger than −10 degrees and equal to or smaller than 10 degrees with respect to an extension line obtained by extending a camber line of the airfoil portion from the leading edge while setting the leading edge as a center, and
   wherein the condition (a) is a condition that a static pressure at a position of the first opening end is equal to a static pressure at a position of the second opening end when the airfoil portion receives a fluid flow from a direction of the angle A1 toward the leading edge.

2. The airfoil according to claim 1, wherein the device includes a fuselage of an aircraft, and
   the airfoil portion includes a vertical tail or a horizontal tail of the aircraft.

3. The airfoil according to claim 2, wherein the airfoil surface includes a left side surface and a right side surface of the vertical tail, and
   the first opening end is opened to the left side surface of the vertical tail while the second opening end is opened to a surface of a right-side portion of the fuselage, or
   the first opening end is opened to the right side surface of the vertical tail while the second opening end is opened to a surface of a left-side portion of the fuselage.

4. The airfoil according to claim 2, wherein the airfoil surface includes an upper surface and a lower surface of the horizontal tail,
   the first opening end is opened to the upper surface or the lower surface of the horizontal tail, and
   the second opening end is opened to a surface of the fuselage.

5. An airfoil comprising:
   an airfoil portion having an airfoil surface extending along a spanwise direction between a leading edge and a trailing edge;
   a connection member to which the airfoil portion is connected; and
   at least one communication hole having a first opening end opened to the airfoil surface and a second opening end opened to a surface of the connection member and extending in the airfoil portion and the connection member.

6. The airfoil according to claim 5, wherein the airfoil surface includes a pressure surface and a suction surface, and the surface of the connection member is connected to the airfoil portion and includes an end wall surface forming a flow path of a working fluid of a turbine.

7. The airfoil according to claim 6, wherein the first opening end is opened to the pressure surface or the suction surface, and
the second opening end is opened to the end wall surface of the connection member.

8. The airfoil according to claim 6, wherein the surface of the connection member further includes an upstream end surface disposed in an upstream of the fluid path from the airfoil portion and extending along a plane perpendicular to an axial direction,
the first opening end is opened to the pressure surface or the suction surface, and
the second opening end is opened to the upstream end surface.

9. The airfoil according to claim 6, wherein the surface of the connection member further includes a downstream end surface disposed downstream from the airfoil portion and extends along a plane perpendicular to an axial direction,
the first opening end is opened to the pressure surface or the suction surface, and
the second opening end is opened to the downstream end surface.

10. The airfoil according to claim 6, wherein the surface of the connection member includes a circumferential end surface,
the circumferential end surface of the connection member of the airfoil and a circumferential end surface of a connection member of an airfoil adjacent to the airfoil in a circumferential direction face each other by interposing a gap,
the first opening end is opened to the pressure surface or the suction surface, and
the second opening end is opened to the circumferential end surface.

11. The airfoil according to claim 6, wherein the first opening end is opened to the pressure surface at a position on the leading edge side from a point on the pressure surface having a tangential line parallel to a chord direction of the airfoil portion.

12. The airfoil according to claim 6, wherein the first opening end is opened to the suction surface at a position on the leading edge side from an intersecting point between the suction surface and a straight line through the leading edge and parallel to the camber line of the airfoil portion in the leading edge.

13. The airfoil according to claim 5, wherein, on a cross-section perpendicular to the spanwise direction through a position of the first opening end of the spanwise direction, an angle A1 satisfying a condition (a) exists within an angle range equal to or larger than −10 degrees and equal to or smaller than 10 degrees with respect to an extension line obtained by extending a camber line of the airfoil portion from the leading edge while setting the leading edge as a center, and
wherein the condition (a) is a condition that a static pressure at a position of the first opening end of the airfoil surface is equal to a static pressure at a position of the second opening end on the surface of the connection member when the airfoil portion receives a fluid flow from a direction of the angle A1 toward the leading edge.

14. The airfoil according to claim 1, wherein, viewed from the spanwise direction, an angle between a part of a tangential line of the airfoil surface at the first opening end, the part being located in the leading edge side from the first opening end, and the communication hole of the first opening end is equal to or smaller than 45 degrees.

15. A mechanical machine comprising the airfoil according to claim 1.

* * * * *